(12) United States Patent
Kuroi et al.

(10) Patent No.: US 8,212,985 B2
(45) Date of Patent: Jul. 3, 2012

(54) LIQUID CRYSTAL DISPLAY ELEMENT AND PROJECTION TYPE LIQUID CRYSTAL DISPLAY DEVICE

(75) Inventors: Hidenobu Kuroi, Kanagawa (JP); Akiko Toriyama, Kanagawa (JP); Yasuhiro Shirasaka, Kanagawa (JP); Hisashi Kadota, Kanagawa (JP); Hajime Tsuchiya, Kumamoto (JP); Jun Takahama, Kumamoto (JP)

(73) Assignee: Sony Corporation, Tokyo (JP)

( * ) Notice: Subject to any disclaimer, the term of this patent is extended or adjusted under 35 U.S.C. 154(b) by 353 days.

(21) Appl. No.: 11/895,342

(22) Filed: Aug. 24, 2007

(65) Prior Publication Data

US 2008/0055492 A1    Mar. 6, 2008

(30) Foreign Application Priority Data

Aug. 30, 2006 (JP) ................. P2006-233907
Aug. 30, 2006 (JP) ................. P2006-233908

(51) Int. Cl.
*C09K 19/02* (2006.01)
*G02F 1/1335* (2006.01)
*G02F 1/1337* (2006.01)

(52) U.S. Cl. ............... 349/178; 349/5; 349/130

(58) Field of Classification Search ............... 349/5–10, 349/120, 128, 130–132, 178
See application file for complete search history.

(56) References Cited

U.S. PATENT DOCUMENTS

| 5,370,822 | A  | * | 12/1994 | Matsui et al. ............ 252/299.63 |
| 5,580,489 | A  | * | 12/1996 | Shinjo et al. ............ 252/299.61 |
| 6,842,217 | B1 | * | 1/2005  | Miller et al. .................. 349/198 |
| 7,466,385 | B2 | * | 12/2008 | Lu et al. ........................ 349/139 |
| 2002/0063826 | A1 | * | 5/2002 | Okamoto et al. ............. 349/117 |
| 2005/0219445 | A1 | * | 10/2005 | Kubo ............................. 349/110 |
| 2006/0198967 | A1 | * | 9/2006 | Saito et al. ..................... 428/1.1 |

FOREIGN PATENT DOCUMENTS

| JP | 2001-255562 |   | 9/2001 |
| JP | 2003-119248 |   | 4/2003 |
| JP | 2003-119249 |   | 4/2003 |
| JP | 2005-306949 |   | 11/2005 |
| JP | 2006-022228 |   | 1/2006 |
| JP | 2006011298 A | * | 1/2006 |

* cited by examiner

*Primary Examiner* — Mark Robinson
*Assistant Examiner* — Hung Lam
(74) *Attorney, Agent, or Firm* — Robert J. Depke; Rockey, Depke & Lyons, LLC

(57) ABSTRACT

Disclosed herein is a liquid crystal display element in which a liquid crystal layer is interposed between a pair of substrates laminated to each other by a sealing material such that alignment films are opposed to each other with a predetermined gap between the alignment films, wherein a range of dielectric anisotropy Δε of a material for the liquid crystal layer at a measured temperature of 70° C. is −4.5 to less than zero.

7 Claims, 14 Drawing Sheets

LIQUID CRYSTAL DISPLAY ELEMENT AND PROJECTION TYPE LIQUID CRYSTAL DISPLAY DEVICE

CROSS REFERENCES TO RELATED APPLICATIONS

The present invention contains subject matter related to Japanese Patent Applications JP 2006-233907 and JP 2006-233908, both filed in the Japan Patent Office on Aug. 30, 2006, the entire contents of which being incorporated herein by reference.

BACKGROUND OF THE INVENTION

1. Field of the Invention

The present invention relates to a liquid crystal display element in which a liquid crystal layer is interposed between a pair of substrates laminated to each other by a sealing material such that alignment films are opposed to each other with a predetermined gap between the alignment films, and a projection type liquid crystal display device using the liquid crystal display element.

2. Description of the Related Art

A projection type liquid crystal display device such as a liquid crystal projector or the like separates light emitted from a light source into red, green, and blue, modulates the pieces of color light by three light valves each formed by a liquid crystal display element (hereinafter referred to as an LCD), synthesizes color luminous fluxes after the modulation, and then enlarges and projects resulting light onto a projection surface.

As the light valves included in the liquid crystal projector or the like, an LCD of an active matrix driving type based on thin film transistor (hereinafter referred to as TFT) driving is generally used.

A display system of the active matrix driving type includes a twisted nematic (TN type) liquid crystal having a molecular alignment twisted by 90 degrees.

Recently, for higher luminance, higher contrast, higher definition, and longer life of liquid crystal projector devices, a vertical alignment type liquid crystal element has begun to be considered.

A vertically aligned liquid crystal material is a liquid crystal material having a negative dielectric anisotropy (a negative value obtained by subtracting a dielectric constant $\epsilon_\perp$ in a direction perpendicular to the major axis of a liquid crystal molecule from a dielectric constant $\epsilon_\parallel$ in a direction parallel to the major axis of the liquid crystal molecule). Liquid crystal molecules are aligned in a direction substantially perpendicular to the surface of a substrate when voltage applied to the liquid crystal is zero. Therefore this vertical alignment type liquid crystal display element can provide a very high contrast ratio.

The vertical alignment type liquid crystal display element is used as both a transmissive type and a reflective type, and is expected to become mainstream in the liquid crystal projector together with inorganic alignment films for longer life.

For uniform display by an LCD of the active matrix driving type, liquid crystal molecules need to be aligned uniformly over the entire surface of a substrate.

Two substrates each having an alignment film and an electrode formed thereon are arranged such that the alignment films of the respective substrates are opposed to each other, and are laminated to each other by a sealing material in a sealing region situated around a pixel display region where an image is actually displayed.

In order to control a gap between the substrates, a pillar spacer formed by a resist has recently been used.

An empty cell is manufactured by undergoing these processes. Thereafter a liquid crystal is filled into the empty cell, whereby a liquid crystal cell is manufactured.

Incidentally, the above-described liquid crystal is formed of a few kinds of simple-substance liquid crystal materials, and is thus referred to also as a liquid crystal composition. A liquid crystal display element is manufactured by attaching polarizing plates to the manufactured liquid crystal cell.

Various liquid crystal display elements, including materials, have been proposed. For more information, this specification uses Japanese Patent Laid-open No. 2005-306949 as patent Document 1, Japanese Patent Laid-open No. 2003-119248 as Patent Document 2, Japanese Patent Laid-open No. 2003-119249 as Patent Document 3, Japanese Patent Laid-open No. 2006-22228 as Patent Document 4, and Japanese Patent Laid-open No. 2001-255562 as Patent Document 5.

SUMMARY OF THE INVENTION

However, these liquid crystal display elements can cause a problem of so-called burn-in, which refers to the remaining of display at a time of a display change when the same screen has been displayed for a long time.

FIGS. 1A, 1B, 1C, and 1D are diagrams showing an example of an assumed model of occurrence of burn-in.

In FIGS. 1A, 1B, 1C, and 1D, reference numeral 1 denotes a TFT array substrate, reference numeral 2 denotes a counter substrate, reference numerals 3 and 4 denote an alignment film layer, and reference numeral 5 denotes a liquid crystal layer.

It is considered that ionic impurities included in the alignment film layers 3 and 4 and peripheral material such as a seal or the like and various other ionic impurities adhering in processes are mixed in the liquid crystal material of the liquid crystal layer 5 within a liquid crystal cell (FIG. 1A).

As shown in FIG. 1B, when the ionic impurities are adsorbed on the alignment film 3 of the substrate 1, an electric double layer composed of the alignment film layer 3 and an impurity layer is formed.

It is difficult to perform exactly the same processing in fabrication of two substrates, for example the TFT substrate 1 and the counter substrate 2, and impurities do not have the same adsorptive power. Because an amount of adsorption differs between the substrates, as described above, voltage applied to a counter electrode (hereinafter referred to as Vcom voltage) is shifted. When the polarity of signal voltage is reversed, the strength of an electric field actually applied to liquid crystal molecules (effective voltage) becomes different in such a manner as to correspond to a reversal cycle.

As a result, the liquid crystal molecules are swayed, and a blinking phenomenon on a screen such as flicker occurs.

When display is continued with the Vcom voltage causing flicker, as shown in FIG. 1C, a signal balance between a positive signal and a negative signal is lost, and thus a direct-current component is applied to the liquid crystal molecules. Because the direct-current component is applied to one substrate at all times, an ionic impurity within the liquid crystal cell is accumulated on the side of the one substrate 1 in the liquid crystal layer 5.

Then, as shown in FIG. 1D, even when the voltage of all electrodes is set to an off level, the ionic impurity remains accumulated in the vicinity of the alignment film layer 3, and retains a state of applying a minute electric field to the liquid crystal molecules. Thus a burn-in phenomenon is observed.

Reducing an amount of ionic impurities within the liquid crystal cell is effective in solving the problem of occurrence of the burn-in phenomenon.

Description will be made below of entrance routes of ionic impurities entering the liquid crystal cell from materials.

For example, peripheral material includes a sealing material. Recently, a photo-curing type sealing material or a photo-curing and heat curing combination type sealing material is used as the sealing material.

Generally, an acrylic resin or an epoxy resin is used. A photo-radical polymerization initiator and a photo-cationic polymerization initiator are used to polymerize these resins. When these polymerization initiators react insufficiently, the polymerization initiators turn into an ionic impurity. Because liquid crystal material and the sealing material are in contact with each other, ionic impurities within the liquid crystal cell increase dramatically.

In the liquid crystal material, there are ionic impurities remaining at a time of synthesis. In general, as the dielectric anisotropy $\Delta\epsilon$ of the liquid crystal material is increased, the polarity of the liquid crystal is increased, and it becomes easier to dissolve ionic impurities into the liquid crystal. Therefore image quality and reliability become harder to improve.

There are various entrance routes of ionic impurities from the outside. For example, when an alignment film is formed by a method of spin coating or evaporation, in particular, the film is formed so as to reach an end part of a substrate. Therefore water and ionic impurities enter the liquid crystal through an interface between the alignment film and a seal, so that the problem occurs conspicuously.

In addition, there may be a case where peripheral ionic impurities are dissolved during storage of the liquid crystal material or in a process of injecting the liquid crystal material.

With a projection type LCD used in a projector, these problems become more serious. An abnormality in image quality tends to be conspicuous because enlargement and projection are performed. Since an amount of light incident on the panel is very large as compared with a direct-view type, the temperature of the panel becomes high, and a degradation due to the mixing in of a very small amount of ionic impurities tends to be easily visible.

Resistance not only to water and temperatures but also to light is required, and a very slight contamination can be a serious problem. With the projection type LCD, in particular, not only the problem of worsening of burn-in by light irradiation but also various problems arising from ionic impurities tend to become more serious.

It is desirable to provide a liquid crystal display element and a projection type liquid crystal display device that can reduce an amount of ionic impurities within a liquid crystal cell, prevent the occurrence of the burn-in phenomenon and the like, and in turn provide higher image quality.

According to an embodiment of the present invention, there is provided a liquid crystal display element in which a liquid crystal layer is interposed between a pair of substrates laminated to each other by a sealing material such that alignment films are opposed to each other with a predetermined gap between the alignment films, wherein a range of dielectric anisotropy $\Delta\epsilon$ of a material for the liquid crystal layer at a measured temperature of 70° C. is −4.5 to less than zero.

Preferably, a liquid crystal material for the liquid crystal layer is a vertical alignment type liquid crystal, and letting $\Delta n$ be refractive index anisotropy and letting d be a cell gap, a range of a retardation $\Delta nd$ is smaller than 0.55 µm.

Preferably, the range of the retardation $\Delta nd$ of the liquid crystal material is 0.34 µm to 0.55 µm, and the range of the dielectric anisotropy $\Delta\epsilon$ of the liquid crystal material at the measured temperature of 70° C. is −4.5 to −2.

Preferably, with respect to 100 parts by weight of a base material for a sealing material, content of a photo-radical polymerization initiator is less than 0.05 weight percent.

Preferably, the liquid crystal display element is an active matrix type liquid crystal display element that performs frame inversion driving in which a voltage applied to each pixel electrode is of same polarity and inverted in each frame.

According to an embodiment of the present invention, there is provided a projection type liquid crystal display device including: a light source; one liquid crystal display device; a condensing optical system for guiding light emitted from the light source to the liquid crystal display element; and a projection optical system for enlarging and projecting light resulting from light modulation by the liquid crystal display element; wherein the liquid crystal display element has a liquid crystal layer interposed between a pair of substrates laminated to each other by a sealing material such that alignment films are opposed to each other with a predetermined gap between the alignment films, and wherein a range of dielectric anisotropy $\Delta\epsilon$ of a material for the liquid crystal layer at a measured temperature of 70° C. is −4.5 to less than zero.

According to an embodiment of the present invention, there is provided a liquid crystal display element in which a liquid crystal layer is interposed between a pair of substrates laminated to each other by a sealing material such that alignment films are opposed to each other with a predetermined gap between the alignment films, wherein with respect to 100 parts by weight of a base material for a sealing material, content of a photo-radical polymerization initiator is less than 0.05 weight percent.

Preferably, the liquid crystal display element is an active matrix type liquid crystal display element that performs frame inversion driving in which a voltage applied to each pixel electrode is of same polarity and inverted in each frame.

Preferably, a liquid crystal panel having the pixel electrode is a transmissive type liquid crystal panel.

Preferably, a pixel pitch of the liquid crystal display element is 20 µm or less.

Preferably, an inorganic alignment film is used as the alignment films.

According to an embodiment of the present invention, there is provided a projection type liquid crystal display device including: a light source; one liquid crystal display element; a condensing optical system for guiding light emitted from the light source to the liquid crystal display element; and a projection optical system for enlarging and projecting light resulting from light modulation by the liquid crystal display element; wherein the liquid crystal display element has a liquid crystal layer interposed between a pair of substrates laminated to each other by a sealing material such that alignment films are opposed to each other with a predetermined gap between the alignment films, and wherein with respect to 100 parts by weight of a base material for a sealing material, content of a photo-radical polymerization initiator is less than 0.05 weight percent.

Preferably, the liquid crystal display element is an active matrix type liquid crystal display element that performs frame inversion driving in which a voltage applied to each pixel electrode is of same polarity and inverted in each frame.

According to the present invention, it is possible to reduce an amount of ionic impurities within a liquid crystal cell, prevent the occurrence of the burn-in phenomenon and the like, and in turn provide higher image quality.

BRIEF DESCRIPTION OF THE DRAWINGS

FIGS. 1A to 1D are diagrams showing an example of an assumed model of occurrence of burn-in;

DETAILED DESCRIPTION OF PREFERRED EMBODIMENTS

A preferred embodiment of the present invention will hereinafter be described with reference to the drawings.

In the present embodiment, description will be made of characteristic constitution and functions of an active matrix type liquid crystal display element, and thereafter description will be made of general constitution and functions of a projection type liquid crystal display device as a suitable electronic device to which the liquid crystal display element is applied.

Figure 1:
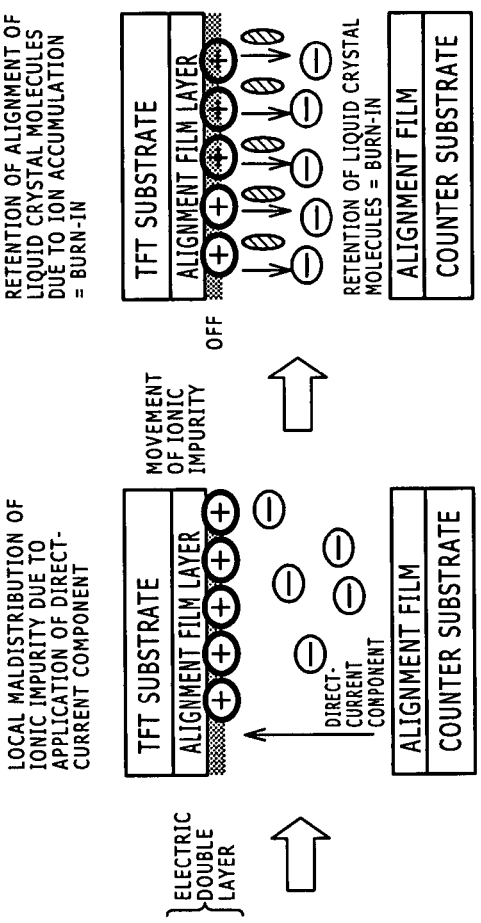
Figure 2:
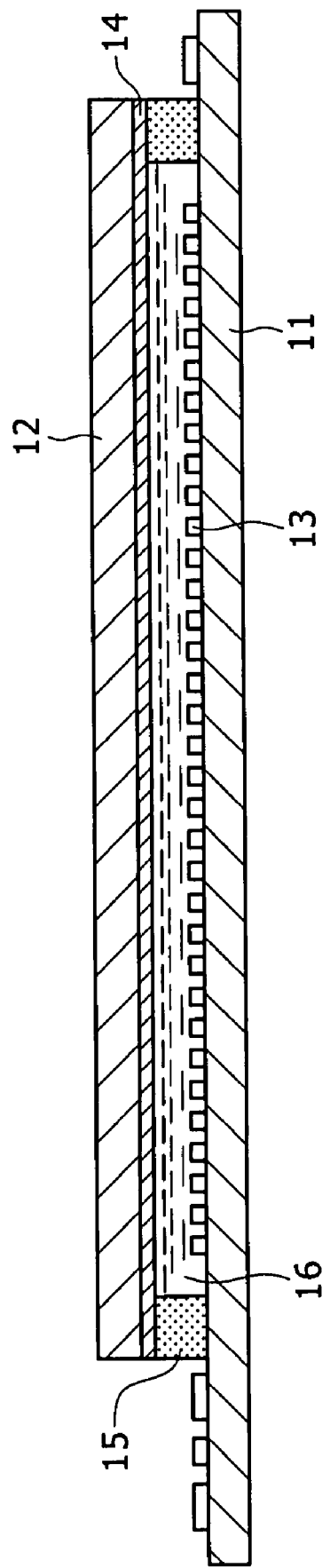
FIG. 2 is a sectional view of a general constitution of an active matrix type liquid crystal display element according to a present embodiment.

FIG. 2 is a sectional view of general constitution of an active matrix type liquid crystal display element according to the present embodiment.

As shown in FIG. 2, the liquid crystal display element 10 according to the present embodiment includes a TFT array substrate 11 and a transparent counter substrate 12 disposed in such a manner as to be opposed to the TFT array substrate 11.

The TFT array substrate 11 is for example formed by a quartz substrate in the case of a transmissive type, and is for example formed by a substrate of silicon material in the case of a reflective type. The counter substrate 12 is for example formed by a glass substrate or a quartz substrate. A pixel electrode 13 is provided on the TFT array substrate 11 in the case of the transmissive type.

The pixel electrode 13 is formed by a thin transparent conductive film such for example as an ITO film (Indium Tin Oxide film). In the case of the reflective type, a reflecting electrode made of a metallic material, for example, is used as the pixel electrode 13. As the metallic material, aluminum, which has a high reflectance in a visible region, is generally used. More specifically, an aluminum metallic film to which a few wt % of copper and silicon are added is generally used. In addition, it is possible to use for example platinum, silver, gold, tungsten, titanium and the like. An entire-surface ITO film 14 as mentioned above is provided on the front surface of the counter substrate 12.

An alignment film not shown in the figure for aligning a liquid crystal in a predetermined direction is formed on the TFT array substrate 11 and the counter substrate 12. A vertically aligned liquid crystal layer 16 is interposed (sealed in) between the pair of substrates laminated to each other by a sealing material 15 such that the alignment films are opposed to each other with a predetermined gap between the alignment films.

Figure 3:
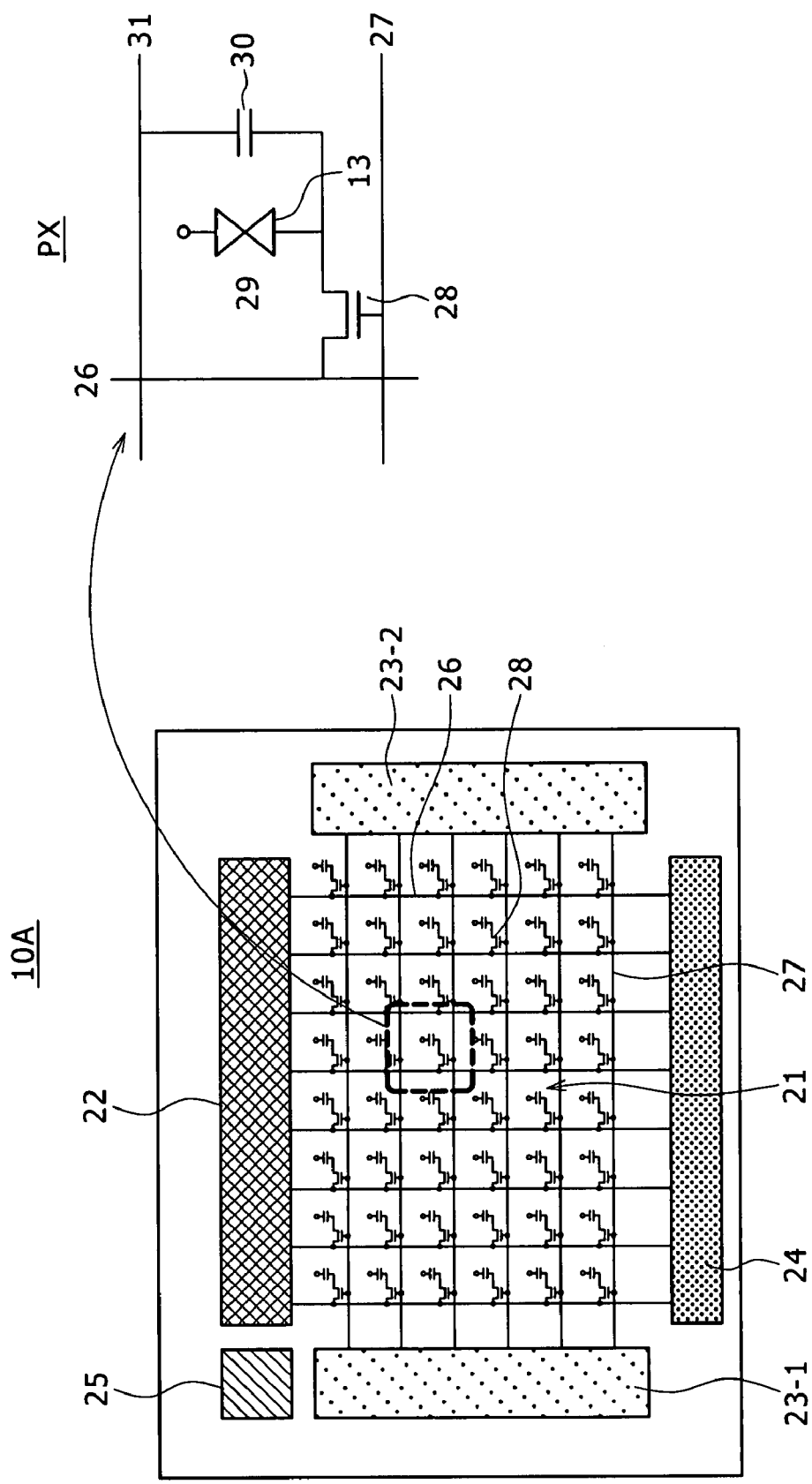
FIG. 3 is a diagram showing an example of an arrangement in an array substrate (liquid crystal panel part) of the active matrix type liquid crystal display element according to the present embodiment.

FIG. 3 is a diagram showing an example of an arrangement in the array substrate (liquid crystal panel part) of the active matrix type liquid crystal display element according to the present embodiment.

As shown in FIG. 3, the liquid crystal display element 10A includes a pixel display area 21 in which pixels are arranged in the form of an array, a horizontal transfer circuit 22, vertical transfer circuits 23-1 and 23-2, a precharge circuit 24, and a level converting circuit 25.

The pixel display area 21 has a plurality of data lines 26 and a plurality of scanning lines (gate wiring) 27 arranged in the form of a grid. One end side of each of the data lines 26 is connected to the horizontal transfer circuit 22, and another end side of each of the data lines 26 is connected to the precharge circuit 24. End parts of each of the scanning lines 27 are connected to the vertical transfer circuits 23-1 and 23-2, respectively.

A plurality of pixels PX constituting the pixel display area 21 of the liquid crystal display element 10A and formed in a matrix manner have a pixel switching transistor 28 for performing switching control, a liquid crystal 29, and an auxiliary capacitance (storage capacitance) 30.

A data line 26 supplied with a pixel signal is electrically connected to the source of the transistor 28 to supply the pixel signal to be written. A scanning line 27 is electrically connected to the gate of the transistor 28. A pulse-like scanning signal is applied to the scanning line 27 in predetermined timing.

The pixel electrode 13 is electrically connected to the drain of the transistor 28. The transistor 28 as a switching element is turned on for a certain period, whereby the pixel signal supplied from the data line 26 is written in predetermined timing.

The pixel signal having a predetermined level which signal is written to the liquid crystal 29 via the pixel electrode 13 is retained for a certain period between the pixel electrode 13 and a counter electrode formed on the counter substrate 12. The alignment or order of a set of molecules of the liquid crystal 29 changes according to the level of voltage applied to the liquid crystal 29. The liquid crystal 29 thereby modulates light, and thus enables gradation display.

In the case of normally white display, incident light is allowed to pass through this liquid crystal part according to the applied voltage, and light having a contrast corresponding to the pixel signal is emitted from the liquid crystal display element as a whole.

In this case, in order to prevent a leakage of the retained pixel signal, the auxiliary capacitance (storage capacitance) 30 is added in parallel with a liquid crystal capacitance formed between the pixel electrode and the counter electrode. Thereby, a retaining characteristic is further improved, and a liquid crystal display element having a high contrast ratio can be realized.

In addition, to form such a retaining capacitance (storage capacitance) 30, common wiring 31 made into a resistance is provided.

The liquid crystal display element 10 according to the present embodiment is for example formed as an active matrix type liquid crystal display element performing frame inversion driving in which a voltage applied to each pixel electrode is of same polarity and inverted in each frame.

Figure 4:
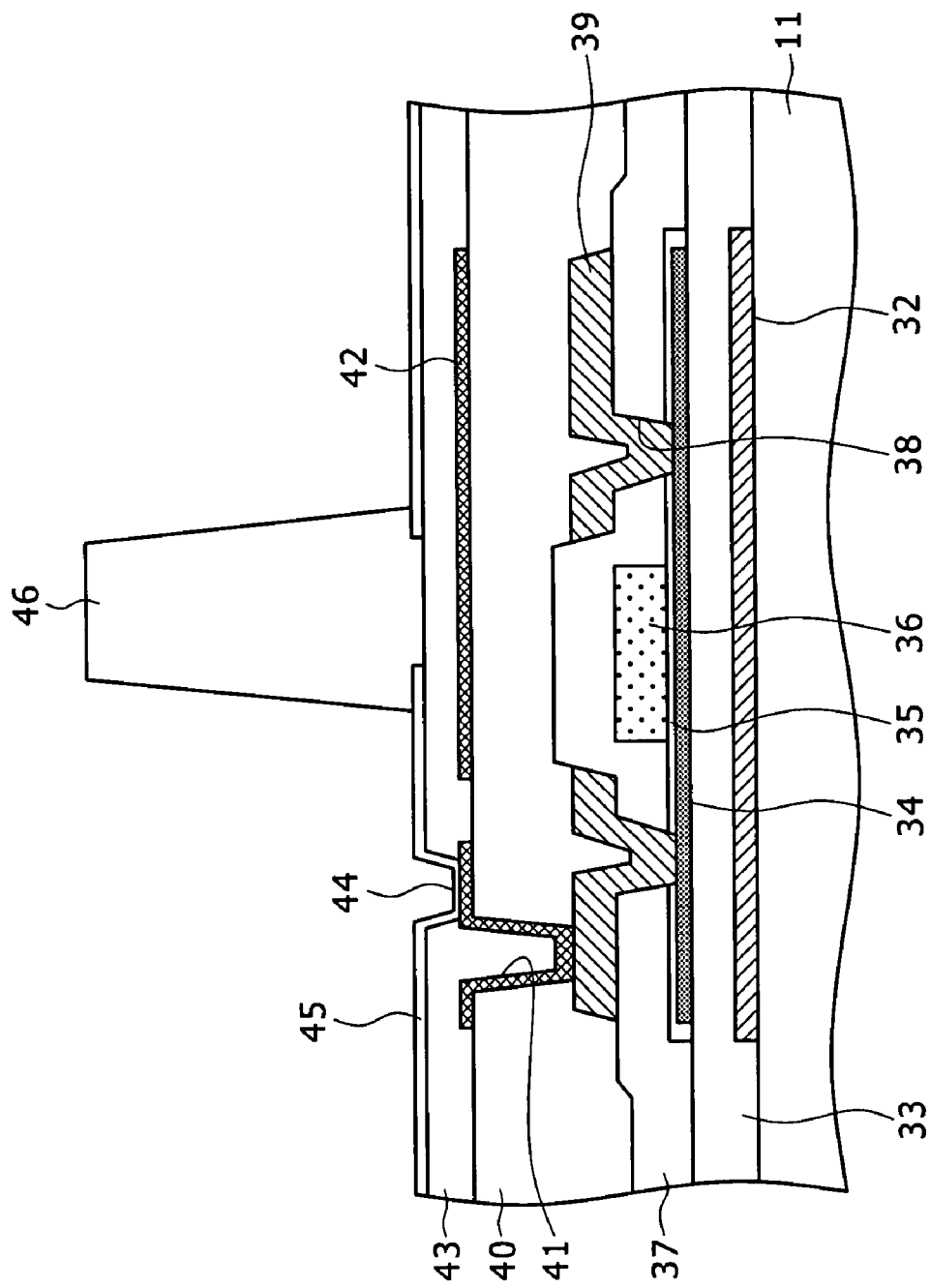
FIG. 4 is a sectional view showing a concrete example of structure of a TFT array substrate side of the active matrix type liquid crystal display element according to the present embodiment.

FIG. 4 is a sectional view showing a concrete example of structure of the TFT array substrate side of the active matrix type liquid crystal display element according to the present embodiment.

This liquid crystal display element 10A includes: the TFT array substrate 11; a first light shielding film 32 formed on the TFT array substrate 11; a first interlayer film 33 formed on the TFT array substrate 11 and the first light shielding film 32; a polycrystalline Si film (p-Si) 34 formed on the first interlayer film 33; a gate insulating film 35 formed on the polycrystalline Si film (p-Si) 34; a gate electrode 36 formed on the gate insulating film 35; a second interlayer film 37 formed on the first interlayer film 33, the gate insulating film 35, and the gate electrode 36; a first contact 38 formed in the second interlayer film 37; a first wiring film 39 formed so as to include the inside of the first contact 38; a third interlayer film 40 formed on the second interlayer film 37 and the first wiring film 39; a second contact 41 formed in the third interlayer film 40; a second light shielding film 42 having conductivity and formed on the third interlayer film 40 so as to include the inside of the second contact 41; a fourth interlayer film 43 formed on the third interlayer film 40 and the second light shielding film 42; a third contact 44 formed in the fourth interlayer film 43; a transparent electrode 45 formed selectively on the fourth interlayer film 43 so as to include the inside of the third contact 44; and a pillar spacer 46 formed on the transparent electrode 45 and the fourth interlayer film 43.

Though not shown in FIG. 4, as described above with reference to FIG. 2, an alignment film for aligning the liquid crystal in a predetermined direction is formed on the TFT array substrate 11 and the counter substrate 12. The vertically aligned liquid crystal layer 16 is interposed (sealed in) between the pair of substrates laminated to each other by the sealing material 15 such that the alignment films are opposed to each other with a predetermined gap between the alignment films.

The liquid crystal display element 10 (10A) according to the present embodiment with the above structure has a characteristic constitution as illustrated in the following so as to be able to reduce an amount of ionic impurities within a liquid crystal cell, suppress occurrence of a burn-in phenomenon and the like, and in turn obtain higher image quality.

The liquid crystal display element 10 is basically the active matrix type liquid crystal display element in which the electrodes 13 and 14 are formed on the opposed surfaces of the respective substrates so as to form pixels in the form of a matrix, and which performs frame inversion driving in which a voltage applied to each pixel electrode is of same polarity and inverted in each frame. An alignment film for aligning the liquid crystal in a predetermined direction is formed on the two substrates 11 and 12. The two substrates 11 and 12 are laminated to each other by the sealing material 15 such that the two substrates 11 and 12 are opposed to each other with a predetermined gap between the two substrates 11 and 12. A vertically aligned liquid crystal layer 16 is interposed between the pair of substrates 11 and 12 laminated to each other so as to be opposed to each other.

The liquid crystal display element 10 has the following characteristic constitution.

A liquid crystal material forming the liquid crystal layer 16 in the liquid crystal display element 10 is characterized in that the range of a retardation $\Delta$nd that can be given as a product of refractive index anisotropy $\Delta$n and a cell gap d is smaller than 0.55 µm and the range of dielectric anisotropy $\Delta\epsilon$ at a measured temperature of 70° C. is −4.5 to less than zero.

Preferably, the range of the retardation $\Delta$nd of the liquid crystal material in the liquid crystal display element 10 is 0.34 µm to 0.55 µm, and the range of the dielectric anisotropy $\Delta\epsilon$ at the measured temperature of 70° C. is −4.5 to −2.

In addition, with respect to 100 parts by weight of a base material for the sealing material, the content of a photoradical polymerization initiator is less than 0.05 weight percent.

Further, it is possible to adopt a constitution in which two of the above three characteristics parts are combined with each other or a constitution in which the three characteristics parts are combined with each other.

Further, the liquid crystal panel is a transmissive type liquid crystal panel, and a pixel pitch is 20 µm or less. In addition, an inorganic alignment film is used as the alignment film.

The above characteristic constitution will be described in more detail.

Measures to prevent a defect such as burn-in or the like caused by an ionic impurity within a liquid crystal cell include a measure of making it harder for the ionic impurity to dissolve even when the ionic impurity exists and a measure of reducing the mixing in of the ionic impurity.

In the former, reducing the dielectric anisotropy $\Delta\epsilon$ of the liquid crystal material and reducing the polarity of the liquid crystal is effective. In the latter, removing a causative material from which the impurity originates is effective.

First, the dielectric anisotropy $\Delta\epsilon$ of the liquid crystal is controlled to make it harder for the ionic impurity to dissolve even when the ionic impurity exists.

When the dielectric anisotropy $\Delta\epsilon$ is smaller than −4, or especially when the dielectric anisotropy $\Delta\epsilon$ is smaller than −4.5, the polarity is enhanced, and thus various problems in reliability including burn-in become noticeable. Details will be shown in embodiments.

On the other hand, when the dielectric anisotropy Δε is zero, the liquid crystal loses a function as liquid crystal. When the dielectric anisotropy Δε is larger than −2, the liquid crystal becomes favorable regarding the presented problem, but may be out of a practical range because threshold voltage Vth becomes high.

The threshold voltage Vth of vertical alignment depends greatly on the dielectric anisotropy Δε, as shown in the following equation.

$$Vth = \pi \sqrt{\frac{K33}{\varepsilon_0 |\Delta\varepsilon|}}$$ [Equation 1]

Figure 5:
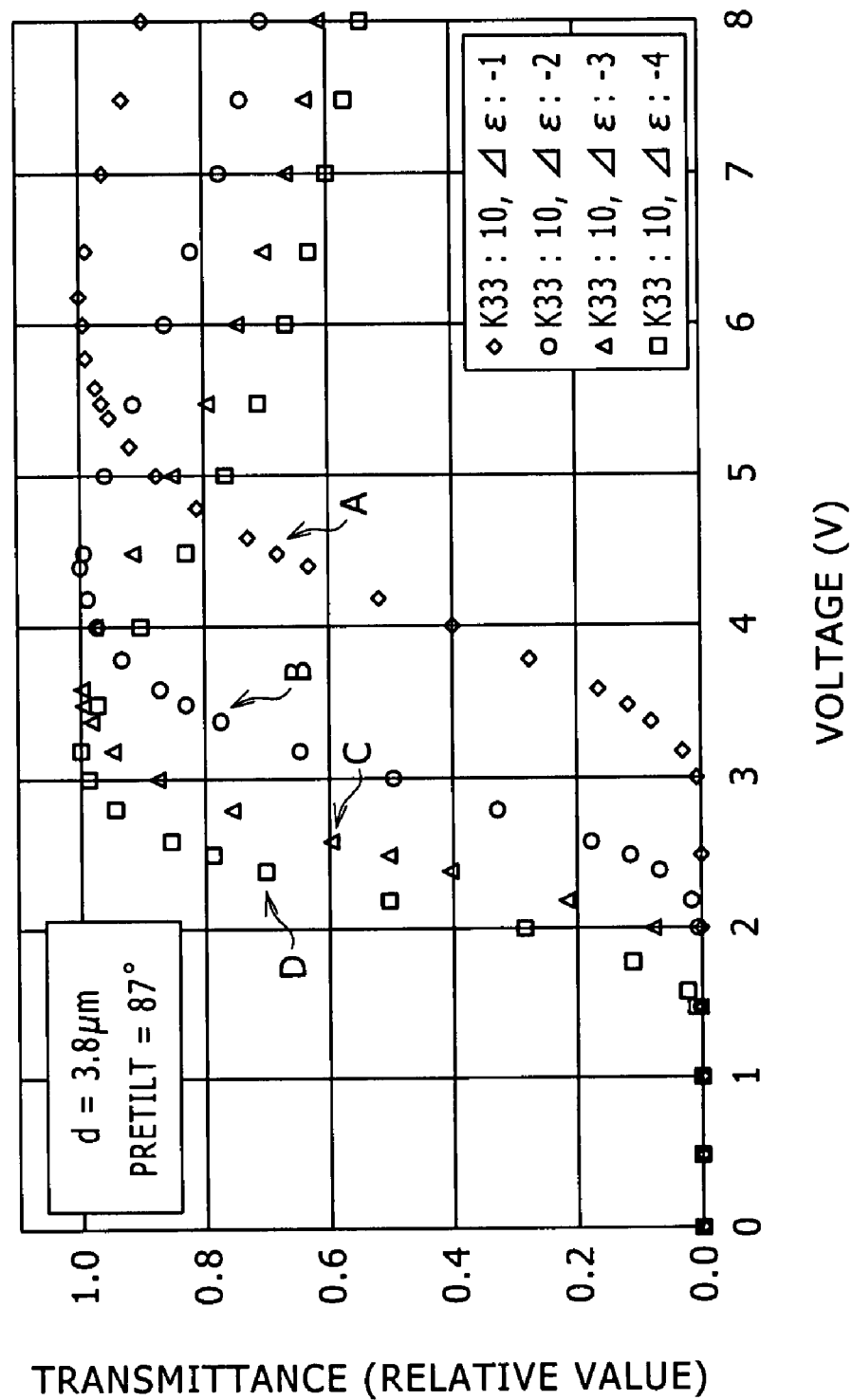
FIG. 5 is a diagram showing voltage versus transmittance characteristic curves when the conditions of dielectric anisotropy $\Delta\epsilon$ and K33 are changed, and is a diagram showing the voltage versus transmittance characteristic curves in a case where K33 is 10.
Figure 6:
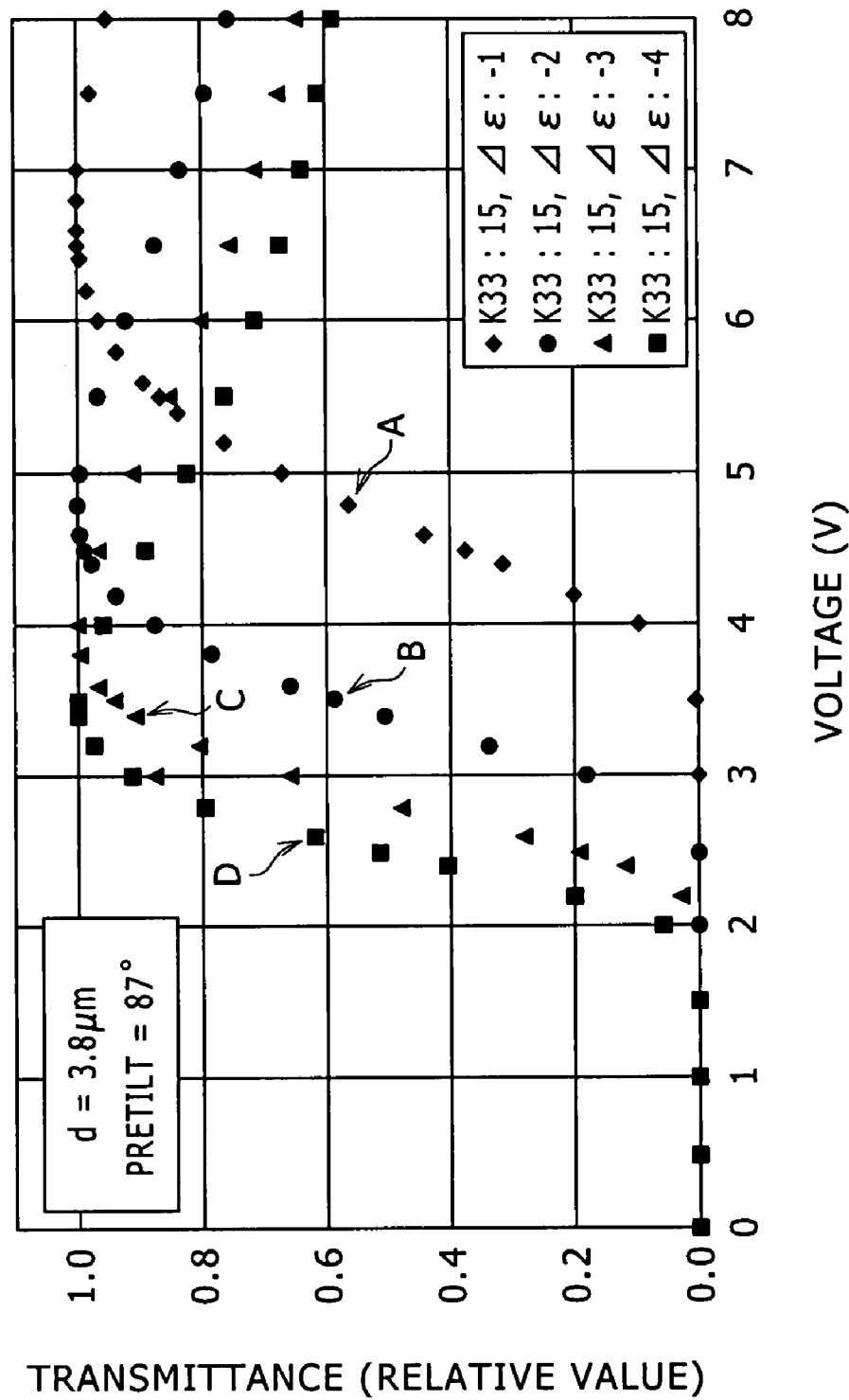
FIG. 6 is a diagram showing voltage versus transmittance characteristic curves when the conditions of dielectric anisotropy $\Delta\epsilon$ and K33 are changed, and is a diagram showing the voltage versus transmittance characteristic curves in a case where K33 is 15.
Figure 7:
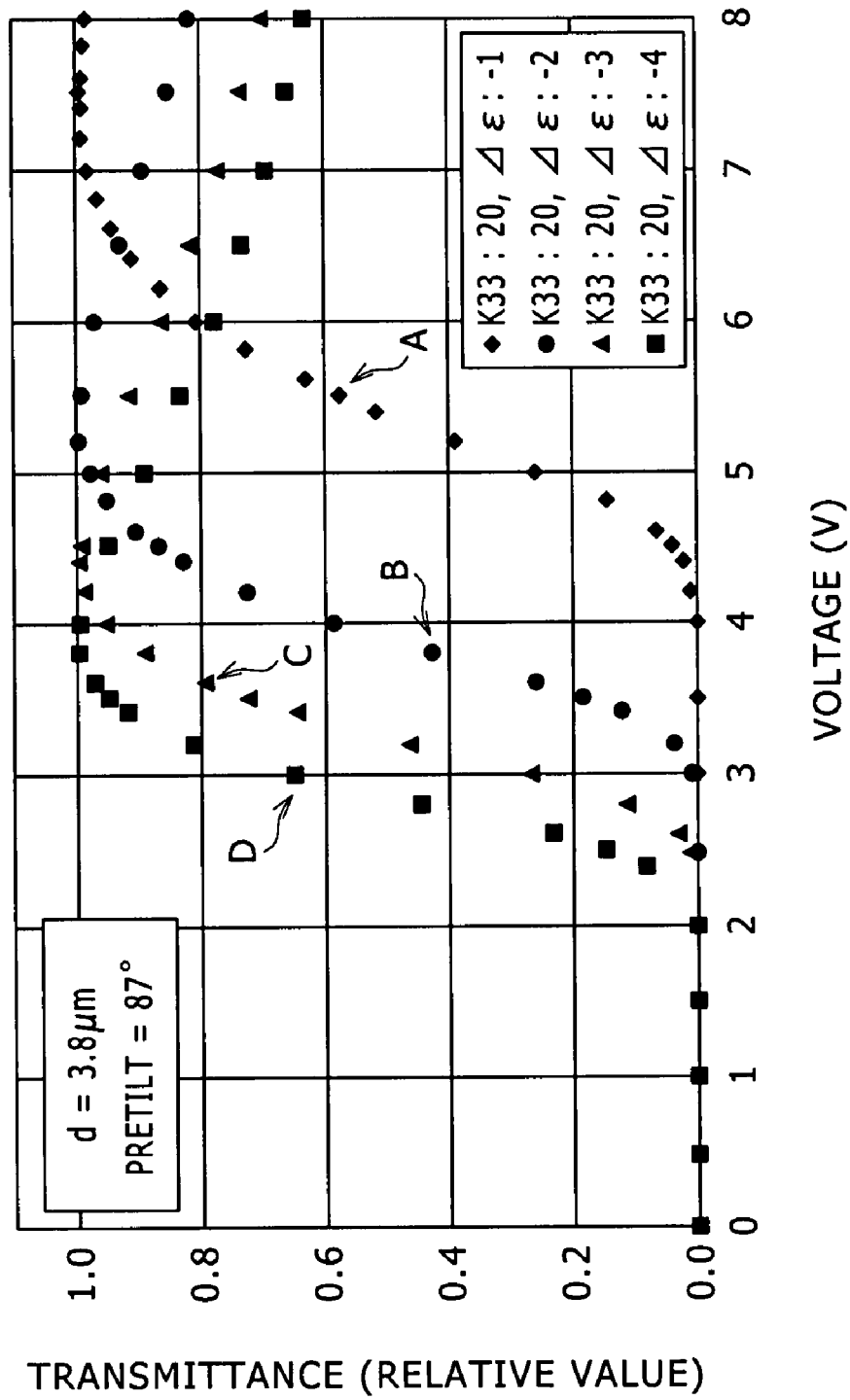
FIG. 7 is a diagram showing voltage versus transmittance characteristic curves when the conditions of dielectric anisotropy $\Delta\epsilon$ and K33 are changed, and is a diagram showing the voltage versus transmittance characteristic curves in a case where K33 is 20.

FIG. 5, FIG. 6, and FIG. 7 are diagrams showing voltage versus transmittance characteristic curves when the conditions of the dielectric anisotropy Δε and K33 are changed. FIG. 5 shows voltage versus transmittance characteristic curves when K33 is 10. FIG. 6 shows voltage versus transmittance characteristic curves when K33 is 15. FIG. 7 shows voltage versus transmittance characteristic curves when K33 is 20.

In FIGS. 5 to 7, an axis of abscissas indicates voltage, and an axis of ordinates indicates relative transmittance. In FIGS. 5 to 7, a curve indicated by A represents a characteristic when the dielectric anisotropy Δε is −1, a curve indicated by B represents a characteristic when the dielectric anisotropy Δε is −2, a curve indicated by C represents a characteristic when the dielectric anisotropy Δε is −3, and a curve indicated by D represents a characteristic when the dielectric anisotropy Δε is −4.

Figure 8:
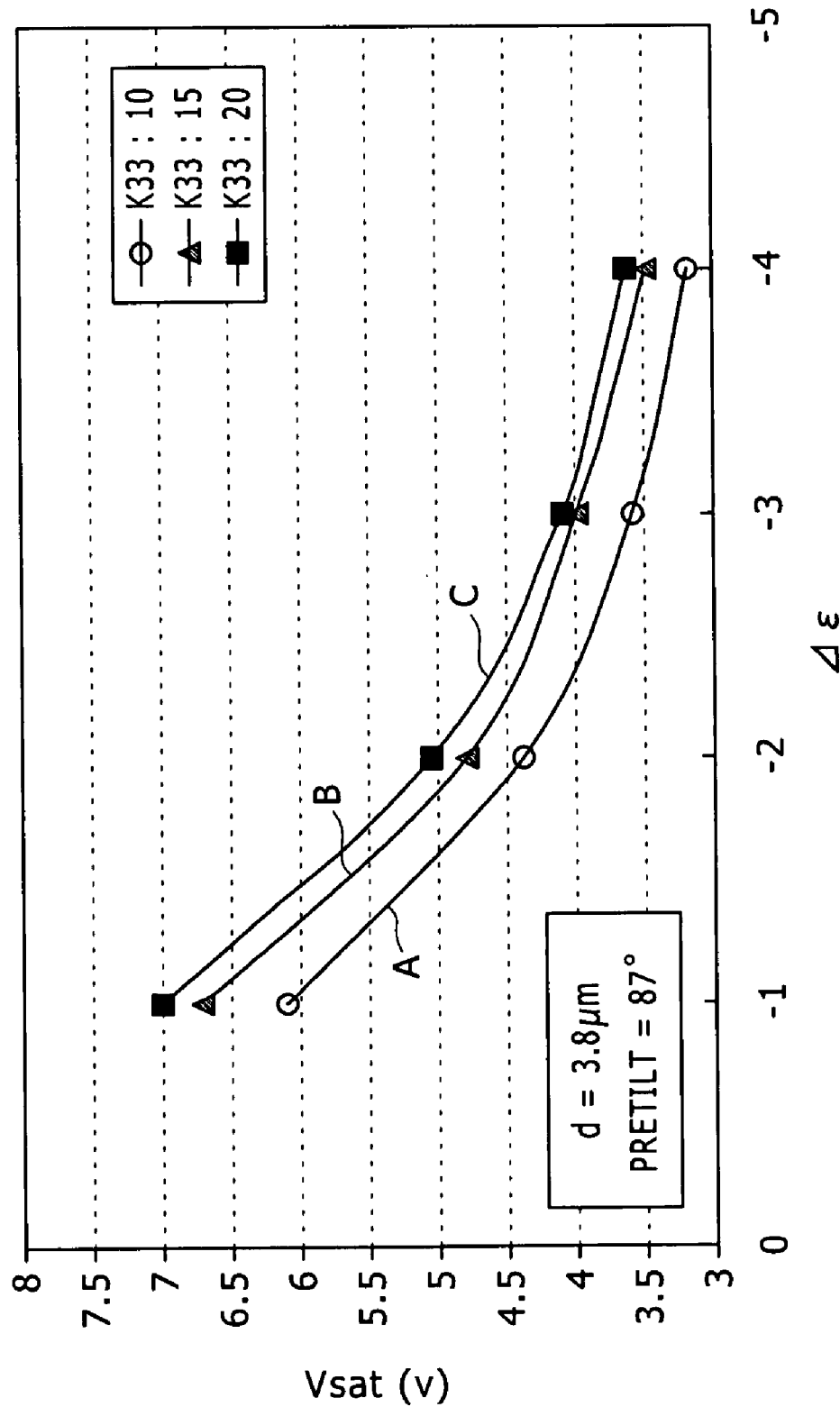
FIG. 8 is a diagram showing relation between the dielectric anisotropy $\Delta\epsilon$ and saturation voltage at which transmittance is 100%.

FIG. 8 is a diagram showing relation between the dielectric anisotropy Δε and saturation voltage at which the transmittance is 100%. In FIG. 8, an axis of abscissas indicates the dielectric anisotropy Δε, and an axis of ordinates indicates the saturation voltage Vsat. In FIG. 8, a curve indicated by A represents a characteristic when K33 is 10, a curve indicated by B represents a characteristic when K33 is 15, and a curve indicated by C represents a characteristic when K33 is 20.

Incidentally, FIGS. 5 to 8 show the characteristics when a cell gap is 3.8 μm, and a pretilt angle is 80°.

In FIGS. 5 to 8, results are presented for K33 in the range of 10 to 20, which can be taken by an ordinary vertically aligned type liquid crystal. Other physical property values and cell parameters are the same, as shown in the figures.

Particular notice is to be taken of the saturation voltage (hereinafter referred to as saturation voltage Vsat, at which the transmittance becomes 100%) of the device as shown in FIG. 8. FIG. 8 shows the relation between the dielectric anisotropy Δε and the saturation voltage Vsat with K33 in the range of 10 to 20.

As shown in FIG. 8, when the dielectric anisotropy Δε becomes larger than −2, the saturation voltage Vsat becomes 5 V or higher, so that driving voltage tends to become high.

Therefore, the dielectric anisotropy Δε to meet requirements of the device for practical use desirably has an upper limit of −2.

Next, as a measure for removing a causative material from which the impurity originates, attention is directed to the polymerization initiator of the seal, and consideration will be given in the following.

This is because the polymerization initiator leaves a small amount of residue after curing, and it is thus assumed that the residue dissolves into the liquid crystal while the liquid crystal display element is used, and therefore ionic impurities are increased, causing display defects such as burn-in, nonuniformity and the like.

The polymerization initiator of the seal includes two kinds of polymerization initiators, that is, a radical polymerization initiator and a cationic polymerization initiator.

As the cationic polymerization initiator, a compound disclosed in Patent Document 1 (Japanese Patent Laid-open No. 2005-306949), for example, is used.

As the radical polymerization initiator, compounds disclosed in Patent Document 2 (Japanese Patent Laid-open No. 2003-119248), Patent Document 3 (Japanese Patent Laid-open No. 2003-119249), Patent Document 4 (Japanese Patent Laid-open No. 2006-22228), and Patent Document 1 (Japanese Patent Laid-open No. 2005-306949), for example, are used.

In Patent Document 4 (Japanese Patent Laid-open No. 2006-22228), in particular, an amount of a radical polymerization initiator is specified in a range of 0.1 to 1 weight percent and more.

However, though described in detail in embodiments, analysis of a panel causing a display defect such as burn-in or the like has shown that the radical polymerization initiator greatly contributes to the defect. It has also been shown that 0.05 weight percent of the radical polymerization initiator presents no problem.

It has also been shown that the cationic polymerization initiator, on the other hand, hardly contributes to the defect, that addition of a certain amount of the cationic polymerization initiator advances the polymerization of resin, and that no problem is presented in an adhering function of the seal.

The range of the retardation Δnd specified in the present embodiment will next be described.

With an orthogonal arrangement of a polarizing plate PL and an analyzing plate DL, in a case of a normally black (NB) mode in which black display is made during non-illumination, the retardation (Δnd) at which a maximum transmittance is obtained is defined by the following theoretical equation.

$$T = \sin^2(2\Theta)\sin^2(\pi\Delta nd/\lambda)$$ [Equation 2]

where Θ is an angle formed between polarized light and a major axis. The first term is at a maximum when Θ=45°. The second term is at a maximum when Δnd=(2n−1)×(λ/2).

That is, a maximum transmittance can be obtained when Δnd=λ/2.

In the vertically aligned liquid crystal of the present device (liquid crystal display element), the major axis of a liquid crystal molecule is aligned in a direction substantially perpendicular to the substrate when zero voltage is applied, and is inclined with respect to an in-plane direction and thereby changes the transmittance when a voltage is applied. When directions of inclination of liquid crystal molecules at a time of driving are not uniform, a display defect such as nonuniformity or the like occurs. In order to prevent this, a slight pretilt needs to be given in a certain direction in advance. When the pretilt and the physical property value such as the dielectric anisotropy Δε are considered, because of the interaction of liquid crystal molecules and the like, the retardation Δnd at which a maximum transmittance is obtained becomes different from a calculated value.

Figure 9:
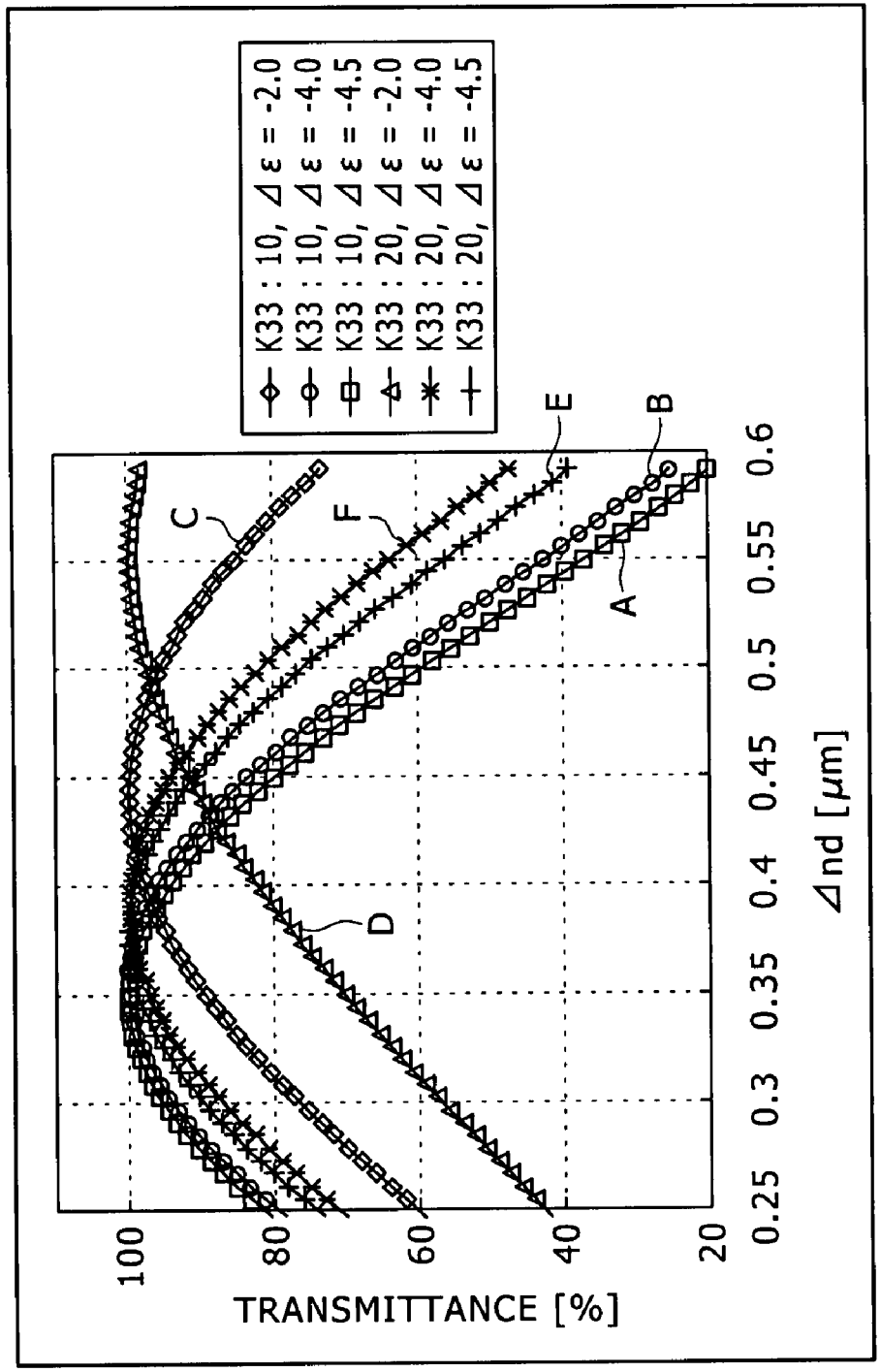
FIG. 9 is a diagram showing $\Delta$nd versus transmittance characteristic curves in a case of green light having a wavelength of 550 nm when the conditions of $\Delta\epsilon$ and K33 are changed with applied voltage=5 V.

FIG. 9 is a diagram showing Δnd versus transmittance characteristic curves in a case of green light having a wavelength of 550 nm when the conditions of Δε and K33 are changed with applied voltage=5 V.

In FIG. 9, an axis of abscissas indicates Δnd, and an axis of ordinates indicates transmittance. In FIG. 9, a curve indicated by A represents a characteristic when K33 is 10 and the dielectric anisotropy $\Delta\epsilon$ is −2.0. A curve indicated by B represents a characteristic when K33 is 10 and the dielectric anisotropy $\Delta\epsilon$ is −4.0. A curve indicated by C represents a characteristic when K33 is 10 and the dielectric anisotropy $\Delta\epsilon$ is −4.5. A curve indicated by D represents a characteristic when K33 is 20 and the dielectric anisotropy $\Delta\epsilon$ is −2.0. A curve indicated by E represents a characteristic when K33 is 20 and the dielectric anisotropy $\Delta\epsilon$ is −4.0. A curve indicated by F represents a characteristic when K33 is 20 and the dielectric anisotropy $\Delta\epsilon$ is −4.5.

Figure 10:
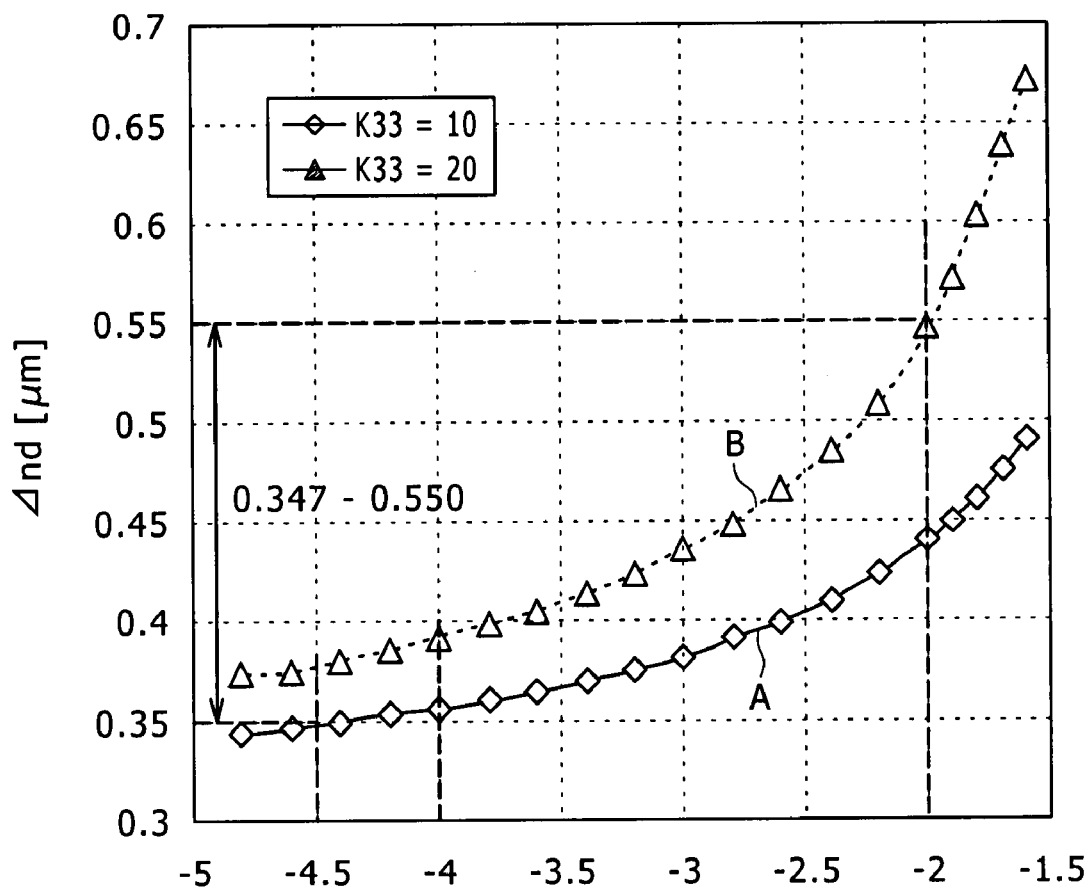
FIG. 10 is a diagram showing relation between the dielectric anisotropy $\Delta\epsilon$ and retardation $\Delta$nd which relation can be derived from the characteristics of FIG. 9.

FIG. 10 is a diagram showing relation between the dielectric anisotropy $\Delta\epsilon$ and the retardation $\Delta nd$ which relation can be derived from the characteristics of FIG. 9.

In FIG. 10, an axis of abscissas indicates the dielectric anisotropy $\Delta\epsilon$, and an axis of ordinates indicates the retardation $\Delta nd$. In FIG. 10, a curve indicated by A represents a characteristic when K33 is 10. A curve indicated by B represents a characteristic when K33 is 20.

In this case, calculation was performed for K33 in the range of 10 to 20, which can be taken by an ordinary vertically aligned type liquid crystal. The dielectric anisotropy $\Delta\epsilon$ was set at −2, −4, and −4.5. Other physical property values and cell parameters are the same (signal voltage Vsig=5 V), as shown in the figures. Incidentally, this calculation was performed using 2DMASTER.

From FIG. 9, the following conditional expressions when K33 is 10 and when K33 is 20 can be derived.

When K33=10, $$-4.5 \leq \Delta\epsilon \leq -2 \rightarrow 0.356 \leq \Delta nd \leq 0.442$$

$$-4 \leq \Delta\epsilon \leq -2 \rightarrow 0.347 \leq \Delta nd \leq 0.442$$

When K33=20, $$-4.5 \leq \Delta\epsilon \leq -2 \rightarrow 0.392 \leq \Delta nd \leq 0.550$$

$$-4 \leq \Delta\epsilon \leq -2 \rightarrow 0.379 \leq \Delta nd \leq 0.550$$

$$\therefore 0.347 \leq \Delta nd \leq 0.550 \qquad \text{[Equation 3]}$$

From this result, in a range of $-4.5 \leq \Delta\epsilon < 0$, the range of the retardation $\Delta nd$ when maximum transmittance is obtained is $\Delta nd \leq 0.55$ μm, and desirably in a range of $-4.0 \leq \Delta\epsilon \leq -2.0$, the range of the retardation $\Delta nd$ when maximum transmittance is obtained is specified as $0.34 \text{ μm} \leq \Delta nd \leq 0.55 \text{ μm}$.

With a decrease in size of the projection type display device, the liquid crystal display element is also reduced in size. A pixel pitch of an XGA type having a substrate size of 22.9 mm (0.9 inches diagonally) is 20 μm or less for higher definition.

Therefore, a very stringent measure is need against alignment disturbance in a reverse tilt domain due to a lateral electric field.

As a measure, making a gap narrower, that is, reducing a cell gap to intensify an electric field in a vertical direction of the TFT array substrate and the counter substrate and prevent the effect of an electric field in a lateral direction is effective. In narrowing the gap, selectively creating a spacer in a light shielding part in particular is very effective in gap control.

Figure 11:
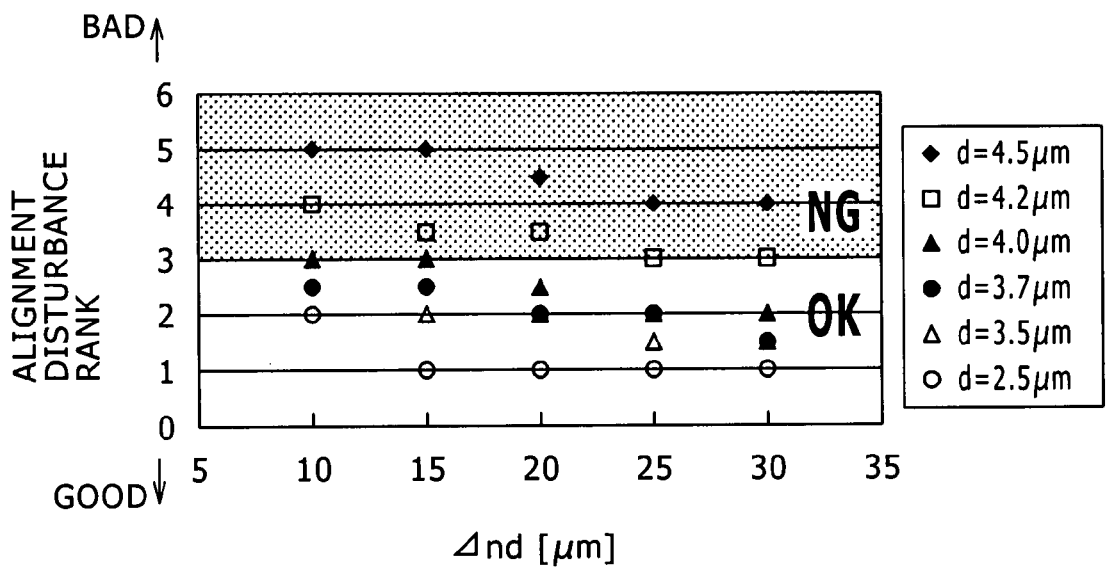
FIG. 11 is a diagram showing relation between a pixel pitch, alignment disturbance, and a cell gap.

FIG. 11 is a diagram showing relation between the pixel pitch, the alignment disturbance, and the cell gap.

In FIG. 11, plot points represented by black squares indicate relation between the pitch and the alignment disturbance when the cell gap d is 4.5 μm. Plot points represented by white squares indicate relation between the pitch and the alignment disturbance when the cell gap d is 4.2 μm. Plot points represented by black triangles indicate relation between the pitch and the alignment disturbance when the cell gap d is 4.0 μm. Plot points represented by black circles indicate relation between the pitch and the alignment disturbance when the cell gap d is 3.7 μm. Plot points represented by white circles indicate relation between the pitch and the alignment disturbance when the cell gap d is 3.5 μm. Plot points represented by white circles indicate relation between the pitch and the alignment disturbance when the cell gap d is 2.5 μm.

As is understood from FIG. 11, to prevent alignment disturbance with a pitch of 20 μm, the cell gap d is desirably 4.0 μm or less.

In this case, the range of the refractive index anisotropy $\Delta n$ where maximum transmittance is obtained is desirably 0.085 or more from $\Delta nd \geq 0.34$ μm as the above-described characteristic and from an expression [$\Delta n \geq 0.34 \text{ μm} \div 4.0 \text{ μm}$].

Incidentally, as for specification of a physical property value, the dielectric anisotropy $\Delta\epsilon$ is specified in a range of −7.0 to −4.3 with an objective of reducing alignment disturbance such as disclination or the like as shown in Patent Document 5 (Japanese Patent Laid-open No. 2001-255562).

However, for the above-described reason, even when disclination is reduced, display defects including burn-in occur.

The present embodiment can provide a liquid crystal display element that can solve the problems of both disclination and display defects such as burn-in and the like.

In addition, the present embodiment is characterized in that the alignment film is an inorganic-base alignment film, as described above.

With a projection type LCD used in a projector, an abnormality in image quality tends to be conspicuous because enlargement and projection are performed. Since an amount of light incident on the panel is very large as compared with a direct-view type, the temperature of the panel becomes high, and a degradation due to the mixing in of a very small amount of ionic impurities tends to be easily visible. Thus resistance not only to water and temperatures but also to light is important.

The inorganic alignment film typically includes silicon formed by evaporation and the like. However, it is considered that a simple substance of a IV-group element such as germanium or the like, a mixture, or a compound, and almost all substances that can form a film by evaporation can be used.

In addition, the inorganic alignment film includes materials having a siloxane skeleton formed by printing, spin coating, and an ink jet method, and the like.

Embodiments of the present invention are shown in the following.

Embodiment

A method of manufacturing an active matrix type liquid crystal display element according to the present embodiment will first be described with reference to FIG. 4.

A metal having a high melting point (WSi in the present embodiment) is formed as a first light shielding film 32 on a TFT array substrate 11 made of quartz.

Thereafter, $SiO_2$ is laminated as a first interlayer film 33, a polycrystalline Si film (p-Si) 34 is formed by a CVD method, and a pattern is formed by etching.

Thereafter, a gate insulating film 35 is formed, a polycrystalline Si film (p-Si) is formed as a gate electrode 36, and a pattern is formed by etching.

Thereafter, $SiO_2$ is laminated as a second interlayer film 37, and a first contact 38 is formed as a source electrode and a drain electrode.

A metallic material (Al in the present embodiment) is formed as a first wiring film 39 by a film formation such as sputtering or the like, and patterning is performed by etching.

Thereafter, $SiO_2$ is laminated as a third interlayer film 40, and a second contact 41 is formed. Then, a metallic film (Ti in the present embodiment) is formed as a second light shielding film 42.

$SiO_2$ is laminated as a fourth interlayer film 43, a third contact 44 is formed, and ITO is patterned as a transparent electrode 45 by etching.

Then, a transparent resist layer serving as a pillar spacer 46 is formed.

PMER (manufactured by Tokyo Ohka Kogyo Co., Ltd.) is coated as a photoresist with a thickness of 3 μm on the substrate by a spin coating method. Thereafter, a process of light exposure by ultraviolet irradiation using a photomask is performed, and then development and firing are performed, whereby the pillar spacer 46 is formed. The pillar spacer 46 is disposed at a desired position between adjacent pixel electrodes.

Next, the TFT array substrate 11 and the counter substrate 12 that have been fabricated are cleaned.

Next, an alignment film is formed on each substrate.

An inorganic alignment film is used as the alignment film. The inorganic alignment film typically includes silicon formed by evaporation and the like. However, it is considered that a simple substance of a IV-group element such as germanium or the like, a mixture, or a compound, and almost all substances that can form a film by evaporation can be used.

In addition, the inorganic alignment film includes materials having a siloxane skeleton formed by printing, spin coating, and an ink jet method, and the like. Of course, not only inorganic materials but also organic materials such as polyimide and the like may be used.

The alignment film is formed on each substrate. Each substrate is introduced into an evaporation apparatus, and the alignment film is formed on each substrate by oblique evaporation of $SiO_2$. The thickness of the film is about 50 nm.

Next, a seal pattern is formed.

Sealing materials used in the present embodiment are shown in Table 1.

TABLE 1

| | | MATERIAL | EXISTING EXAMPLE | I: REDUCTION OF Δε ① | ② | ③ | ④ |
|---|---|---|---|---|---|---|---|
| LIQUID CRYSTAL MATERIAL | | Δε (70° C.) | −5.0 | −4.7 | −4.5 | −4 | −3.5 |
| SEALING MATERIAL | ACRYLATE BASE OLIGOMER | ALBIFLEX712 (HEREINAFTER REFERRED TO AS AF712, MANUFACTURED BY HANSE CHEMIE) | 1% | 1% | 1% | 1% | 1% |
| | EPOXY BASE OLIGOMER | BISPHENOL F TYPE EPOXY RESIN (EPICLON 830S, MANUFACTURED BY DAINIPPON INK AND CHEMICALS, INCORPORATED) | 99% | 99% | 99% | 99% | 99% |
| | PHOTO-RADICAL INITIATOR | IRGACURE 184 MANUFACTURED BY CIBA SPECIALTY CHEMICALS | 0.1% | 0.1% | 0.1% | 0.1% | 0.1% |
| | PHOTO-CATIONIC INITIATOR | WPI-113 MANUFACTURED BY WAKO PURE CHEMICAL INDUSTRIES, LTD. | 1% | 1% | 1% | 1% | 1% |
| EVALUATION RESULT | | BURN-IN | X | X | ○ | ○ | ○ |
| | | FLICKER VALUE (db) OK WHEN LOWER THAN 14 db | 16.2 | 15 | 13.8 | 11.5 | 9.5 |
| | | LIGHT IRRADIATION TEST (PERIPHERAL NONUNIFORMITY) | X | X | ○ | ○ | ○ |
| | | ADHESIVE STRENGTH TEST RELATIVE VALUE (INITIAL) | 1(ref) | — | — | — | — |
| | | ADHESIVE STRENGTH RELATIVE VALUE (PRESERVATION TEST AT 60° C. AND 90% AFTER 500 H) | 0.99 | — | — | — | — |

| | | MATERIAL | II: REDUCTION OF RADICAL INITIATOR ⑤ | ⑥ | ⑦ | ⑧ | I + II ⑨ |
|---|---|---|---|---|---|---|---|
| LIQUID CRYSTAL MATERIAL | | Δε (70° C.) | −5.0 | −5.0 | −5.0 | −5.0 | −3.5 |
| SEALING MATERIAL | ACRYLATE BASE OLIGOMER | ALBIFLEX712 (HEREINAFTER REFERRED TO AS AF712, MANUFACTURED BY HANSE CHEMIE) | 1% | 1% | 1% | 1% | 1% |
| | EPOXY BASE OLIGOMER | BISPHENOL F TYPE EPOXY RESIN (EPICLON 830S, MANUFACTURED BY DAINIPPON INK AND CHEMICALS, INCORPORATED) | 99% | 99% | 99% | 99% | 99% |
| | PHOTO-RADICAL INITIATOR | IRGACURE 184 MANUFACTURED BY CIBA SPECIALTY CHEMICALS | 0.08% | 0.06% | 0.05% | — | — |
| | PHOTO-CATIONIC INITIATOR | WPI-113 MANUFACTURED BY WAKO PURE CHEMICAL INDUSTRIES, LTD. | 1% | 1% | 1% | 1% | 1% |
| EVALUATION RESULT | | BURN-IN | X | Δ | ○ | ○ | ◎ |
| | | FLICKER VALUE (db) OK WHEN LOWER THAN 14 db | 15.9 | 13.8 | 13 | 6.5 | 3.8 |

TABLE 1-continued

| | | | | | |
|---|---|---|---|---|---|
| LIGHT IRRADIATION TEST (PERIPHERAL NONUNIFORMITY) | △ | ○ | ○ | ○ | ◎ |
| ADHESIVE STRENGTH TEST RELATIVE VALUE (INITIAL) | 0.99 | 1.08 | 0.96 | 1.05 | 1.05 |
| ADHESIVE STRENGTH RELATIVE VALUE (PRESERVATION TEST AT 60° C. AND 90% AFTER 500 H) | 0.98 | 0.99 | 1.02 | 0.99 | 1.02 |

One percent of ALBIFLEX712 (hereinafter referred to as AF712, manufactured by hanse chemie), which is a commercially available product disclosed in Patent Document 1 (Japanese Patent Laid-open No. 2005-306949), for example, is used as an acrylate base oligomer. Incidentally, there is no limitation to this commercially available product.

Ninety-nine percent of bisphenol F type epoxy resin (EPICLON 830S, manufactured by Dainippon Ink and Chemicals, Incorporated) is used as an epoxy base oligomer. A commercially available product as disclosed in a paragraph [0018] of Patent Document 4 (Japanese Patent Laid-open No. 2006-22228) may be used.

As a photo-radical initiator, 0.1 percent of Irgacure 184 manufactured by Ciba Specialty Chemicals is used. However, materials as disclosed in paragraphs and [0033] of Patent Document 1 (Japanese Patent Laid-open No. 2005-306949) may be used.

As a photo-cationic initiator, one percent of PI-113 manufactured by Wako Pure Chemical Industries, Ltd. is used. However, materials as disclosed in a paragraph [00331] of Patent Document 1 (Japanese Patent Laid-open No. 2005-306949) may be used.

A liquid crystal material used for a liquid crystal layer is a vertical type liquid crystal material with a negative dielectric anisotropy $\Delta\epsilon$ of $-5$ and a refractive index anisotropy $\Delta n$ of 0.13. The cell gap d as the thickness of the liquid crystal layer is set at 3.5 µm. The liquid crystal display element 10 is then fabricated.

A first to a third comparison example are shown in the following.

First Comparison Example

Reduction of $\Delta\epsilon$ of Liquid Crystal Material

The same process as described above was performed up to a seal formation, and liquid crystal display elements according to embodiments of the present invention were produced changing a liquid crystal material.

Figure 12:
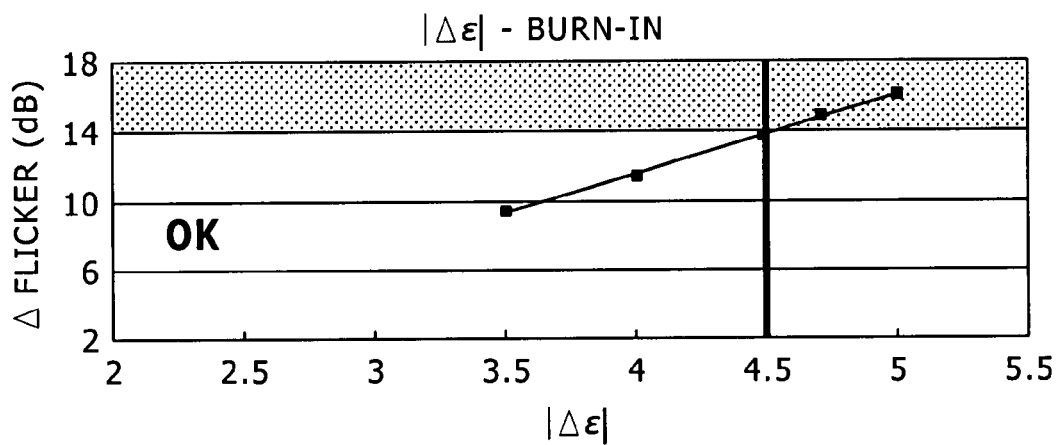
FIG. 12 is a diagram showing relation between |$\Delta\epsilon$| and flicker in a first comparison example.

For the liquid crystal material, four conditions in which the dielectric anisotropy $\Delta\epsilon$ is $-4.7$, $-4.5$, $-4$, and $-3.5$ were used, and the refractive index anisotropy $\Delta n$ was set at 0.13. The cell gap d as the thickness of the liquid crystal layer was set at 3.5 µm. Then external packaging was performed using a flexible wiring board and the like, and a liquid crystal display element capable of forming an image was fabricated. Evaluations to be described below were performed, and comparison was made with an existing example having an ordinary constitution. Results are shown in the above Table 1 and FIG. 12. FIG. 12 shows relation between $|\Delta\epsilon|$ and flicker.

[Evaluations]
(Burn-In)
The liquid crystal display elements according to the present embodiments were put in a projection type display device at 70° C., and were made to retain a checker pattern for eight hours.

Thereafter the liquid crystal display elements were switched to a raster pattern, and an image quality evaluation was performed. Ranks are: a cross (X) for a liquid crystal display element leaving a clearly visible checker pattern; a triangle (△) for a liquid crystal display element leaving part of the checker pattern; a circle (○) for a liquid crystal display element leaving a hardly visible checker pattern; and a double circle (◎) for a liquid crystal display element leaving no visible checker pattern.

Figure 13:
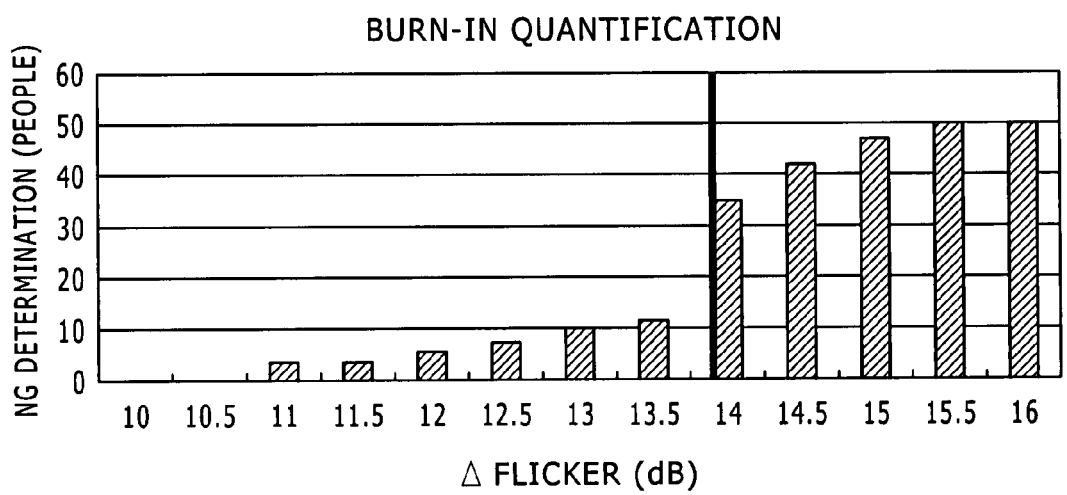
FIG. 13 is a diagram showing an acceptability criterion for a flicker value.

(Flicker Value)
Measurement was performed using a spectrum analyzer.
An acceptability criterion for the flicker value is shown in FIG. 13. After viewing a burn-in image, 50 people filled out an NG-OK questionnaire.

As a result, an NG judgment was made when the flicker value is 14 dB or higher.

In other words, as is understood from FIG. 12, control can be performed to burn-in at 14 dB or lower by making a design such that $|\Delta\epsilon|<4.5$ at 70° C.

(Light Irradiation Test)
The liquid crystal display elements according to the embodiments of the present invention were put in a light irradiation test device at 90° C. provided with a 250-W UHP lamp, and occurrence of peripheral variations after a certain time was observed.

Ranks are: a cross (X) for a liquid crystal display element having variations or stains on the entire screen; a triangle (△) for a liquid crystal display element having variations or stains on part of the screen; a circle (○) for a liquid crystal display element having hardly visible variations or stains; and a double circle (◎) for a liquid crystal display element having no visible abnormalities.

The liquid crystal display elements with a dielectric anisotropy $\Delta\epsilon$ of $-4.5$ or less are excellent in terms of burn-in, the flicker value, and the light irradiation test result.

Thus, the liquid crystal display elements according to the embodiments of the present invention can provide a more reliable higher-quality liquid crystal display element.

Second Comparison Example

Reduction of Radical Initiator

The same process as described above was performed up to a seal formation, and a condition of the sealing material was changed.

Liquid crystal display elements according to embodiments of the present invention were produced under conditions where 0.08%, 0.06%, 0.05%, or none of the radical initiator was used.

Figure 14:
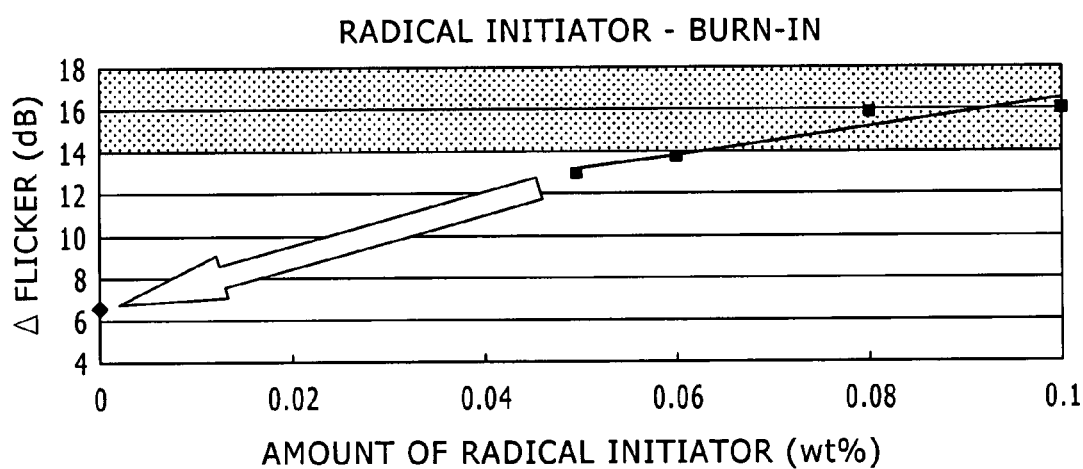
FIG. 14 is a diagram showing relation between an amount of a radical initiator and flicker.

As for liquid crystal material, dielectric anisotropy $\Delta\epsilon$ was $-5$, and refractive index anisotropy $\Delta n$ was set at 0.13. The cell gap d as thickness of the liquid crystal layer was set at 3.5 µm. Then external packaging was performed using a flexible wiring board and the like, and a liquid crystal display element capable of forming an image was fabricated. Evaluations to be described below were performed, and comparison was made with an existing example having an ordinary constitution. Results are shown in the above Table 1 and FIG. 14. FIG. 14 shows relation between an amount of the radical initiator and flicker.

[Evaluations]

(Burn-In)

The liquid crystal display elements according to the present embodiments were put in a projection type display device at 70° C., and were made to retain a checker pattern for eight hours.

Thereafter the liquid crystal display elements were switched to a raster pattern, and an image quality evaluation was performed. Ranks are: a cross (X) for a liquid crystal display element leaving a clearly visible checker pattern; a triangle (Δ) for a liquid crystal display element leaving part of the checker pattern; a circle (○) for a liquid crystal display element leaving a hardly visible checker pattern; and a double circle (◉) for a liquid crystal display element leaving no visible checker pattern.

(Flicker Value)

Measurement was performed using a spectrum analyzer.

After viewing a burn-in image, 50 people filled out an NG-OK questionnaire.

As a result, an NG judgment was made when the flicker value is 14 dB or higher.

As is understood from FIG. 14, when the amount of the radical initiator is reduced in a liquid crystal with $|\Delta\epsilon|=5.0$ at 70° C., burn-in level is reduced.

(Light Irradiation Test)

The liquid crystal display elements according to the embodiments of the present invention were put in a light irradiation test device at 90° C. provided with a 250-W UHP lamp, and occurrence of peripheral variations after a certain time was observed.

Ranks are: a cross (X) for a liquid crystal display element having variations or stains on the entire screen; a triangle (Δ) for a liquid crystal display element having variations or stains on part of the screen; a circle (○) for a liquid crystal display element having hardly visible variations or stains; and a double circle (◉) for a liquid crystal display element having no visible abnormalities.

The liquid crystal display elements with a dielectric anisotropy $\Delta\epsilon$ of −4.5 or less are excellent in terms of burn-in, the flicker value, and the light irradiation test result.

(Adhesive Strength)

A sample obtained by coating a glass slide with a fixed quantity of sealing material according to an embodiment, allowing the sealing material to cure under pressure at 100 mW/cm$^2$ for 60 seconds, and thereafter firing the sealing material in an oven at 130° C. for one hour was subjected to a strength measurement using a tension gage. Relative values with one for an existing example having an ordinary constitution are shown.

Thereafter a preservation test for 500 hours at 60° C. and 90% was conducted, and the strength measurement was performed again.

It is shown that the liquid crystal display elements with 0.05 wt % of the radical initiator are excellent in terms of burn-in, the flicker value, and the light irradiation test result.

There was no risk of adhesive strength being decreased due to the reduction of the radical initiator. In particular, no problem was presented when the radical initiator is reduced to zero wt %.

It has been shown that a sufficient adhesive effect is obtained when a certain amount of a cationic initiator is introduced.

Thus, the liquid crystal display elements according to the embodiments of the present invention can provide a more reliable higher-quality liquid crystal display element.

Third Comparison Example

Synergistic Effect of Reduction of $\Delta\epsilon$ and Reduction of Radical Initiator The same process as described above was performed up to a seal formation, and a condition of the sealing material was changed.

Figure 15:
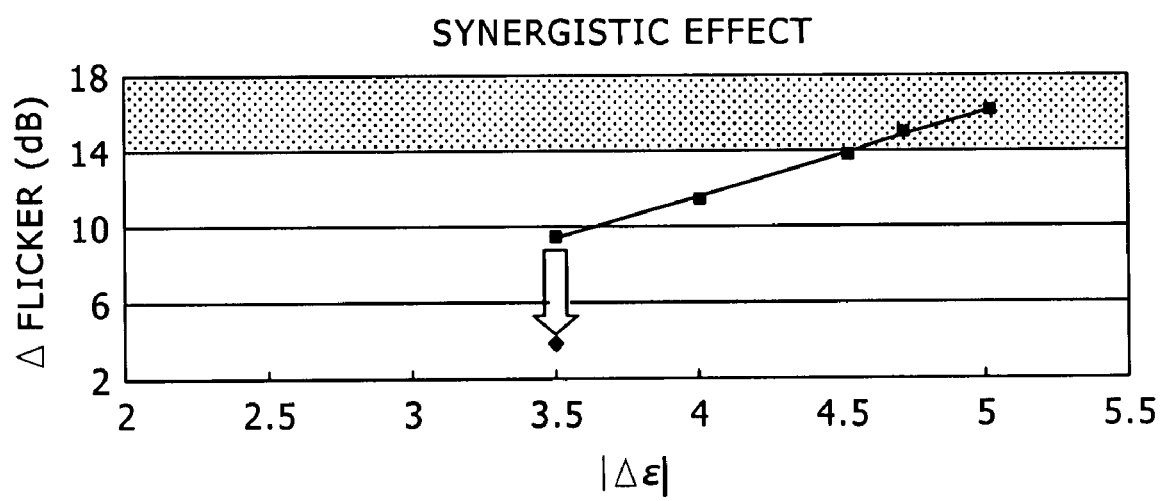
FIG. 15 is a diagram showing relation between |$\Delta\epsilon$| and flicker in a third comparison example.

A condition where none of the radical initiator was used was set. As for liquid crystal material, dielectric anisotropy $\Delta\epsilon$ was −3.5, and refractive index anisotropy $\Delta n$ was set at 0.13. The cell gap d as thickness of the liquid crystal layer was set at 3.5 μm. Then external packaging was performed using a flexible wiring board and the like, and a liquid crystal display element capable of forming an image was fabricated. Evaluations to be described below were performed, and comparison was made with an existing example having an ordinary constitution. Results are shown in the above Table 1 and FIG. 15. FIG. 15 shows relation between $|\Delta\epsilon|$ and flicker.

[Evaluations]

(Burn-In)

The liquid crystal display elements according to the present embodiments were put in a projection type display device at 70° C., and were made to retain a checker pattern for eight hours.

Thereafter the liquid crystal display elements were switched to a raster pattern, and an image quality evaluation was performed. Ranks are: a cross (X) for a liquid crystal display element leaving a clearly visible checker pattern; a triangle (Δ) for a liquid crystal display element leaving part of the checker pattern; a circle (○) for a liquid crystal display element leaving a hardly visible checker pattern; and a double circle (◉) for a liquid crystal display element leaving no visible checker pattern.

(Flicker Value)

Measurement was performed using a spectrum analyzer.

After viewing a burn-in image, 50 people filled out an NG-OK questionnaire.

As a result, an NG judgment was made when the flicker value is 14 dB or higher.

(Light Irradiation Test)

The liquid crystal display elements according to the embodiments of the present invention were put in a light irradiation test device at 90° C. provided with a 250-W UHP lamp, and occurrence of peripheral variations after a certain time was observed.

Ranks are: a cross (X) for a liquid crystal display element having variations or stains on the entire screen; a triangle (Δ) for a liquid crystal display element having variations or stains on part of the screen; a circle (○) for a liquid crystal display element having hardly visible variations or stains; and a double circle (◉) for a liquid crystal display element having no visible abnormalities.

The liquid crystal display elements with a dielectric anisotropy $\Delta\epsilon$ of −4.5 or less are excellent in terms of burn-in, the flicker value, and the light irradiation test result.

(Adhesive Strength)

A sample obtained by coating a glass slide with a fixed quantity of sealing material according to an embodiment, allowing the sealing material to cure under pressure at 100 mW/cm$^2$ for 60 seconds, and thereafter firing the sealing material in an oven at 130° C. for one hour was subjected to a strength measurement using a tension gage. Relative values with one for an example of an ordinary constitution (existing example) are shown.

Thereafter a preservation test for 500 hours at 60° C. and 90% was conducted, and the strength measurement was performed again.

A combination of the reduction of the radical initiator and the reduction of the dielectric anisotropy Δε can provide excellent results in all evaluation items.

Thus, the liquid crystal display elements according to the embodiments of the present invention can provide a more reliable higher-quality liquid crystal display element.

The constitution of a projection type liquid crystal display device as an example of an electronic device using the above liquid crystal display element will next be described with reference to a schematic constitution diagram of FIG. 16.

Figure 16:
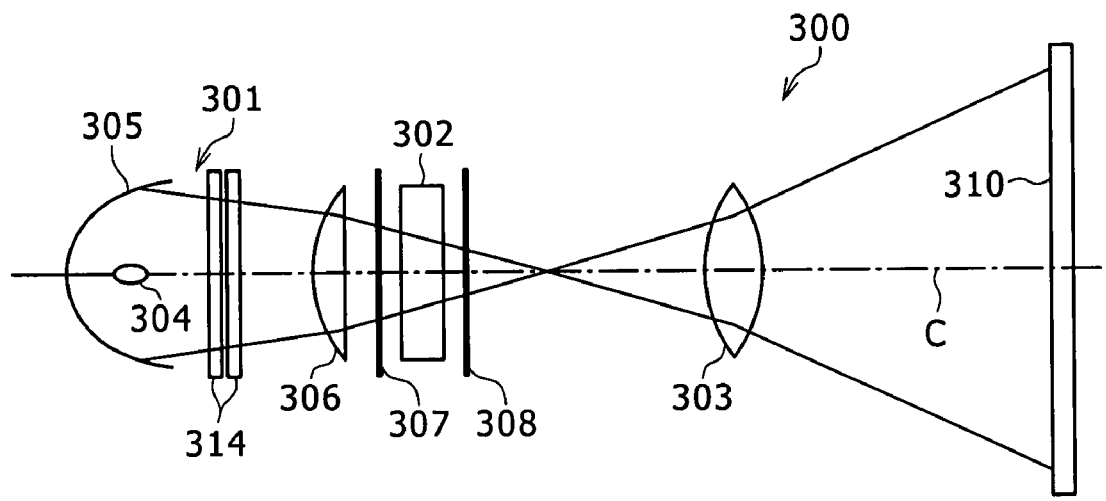
FIG. 16 is a schematic constitution diagram showing an example of a projection type liquid crystal display device according to the present embodiment.

As shown in FIG. 16, the projection type liquid crystal display device (liquid crystal projector) 300 is formed by arranging a light source 301, a transmissive type liquid crystal display element 302, and a projection optical system 303 in this order along an optical axis C.

A component of light emitted from a lamp 304 forming the light source 301 which component is radiated backward is condensed in a forward direction by a reflector 305, and then enters a condenser lens 306. The condenser lens 306 further concentrates the light, and guides the light to the liquid crystal display element 302 via an incidence side polarizing plate 307.

The guided light is converted into an image by the liquid crystal display element 302 having a function of a shutter or a light valve and an emission side polarizing plate 308. The displayed image is enlarged and projected onto a screen 310 via the projection optical system 303.

Incidentally, a filter 314 is inserted between the light source 301 and the condenser lens 306 to remove light of unnecessary wavelengths included in the light from the light source, for example infrared light and ultraviolet light.

The constitution of a projection type liquid crystal display device as an example of an electronic device using the above liquid crystal display element will next be described with reference to FIG. 17.

Figure 17:
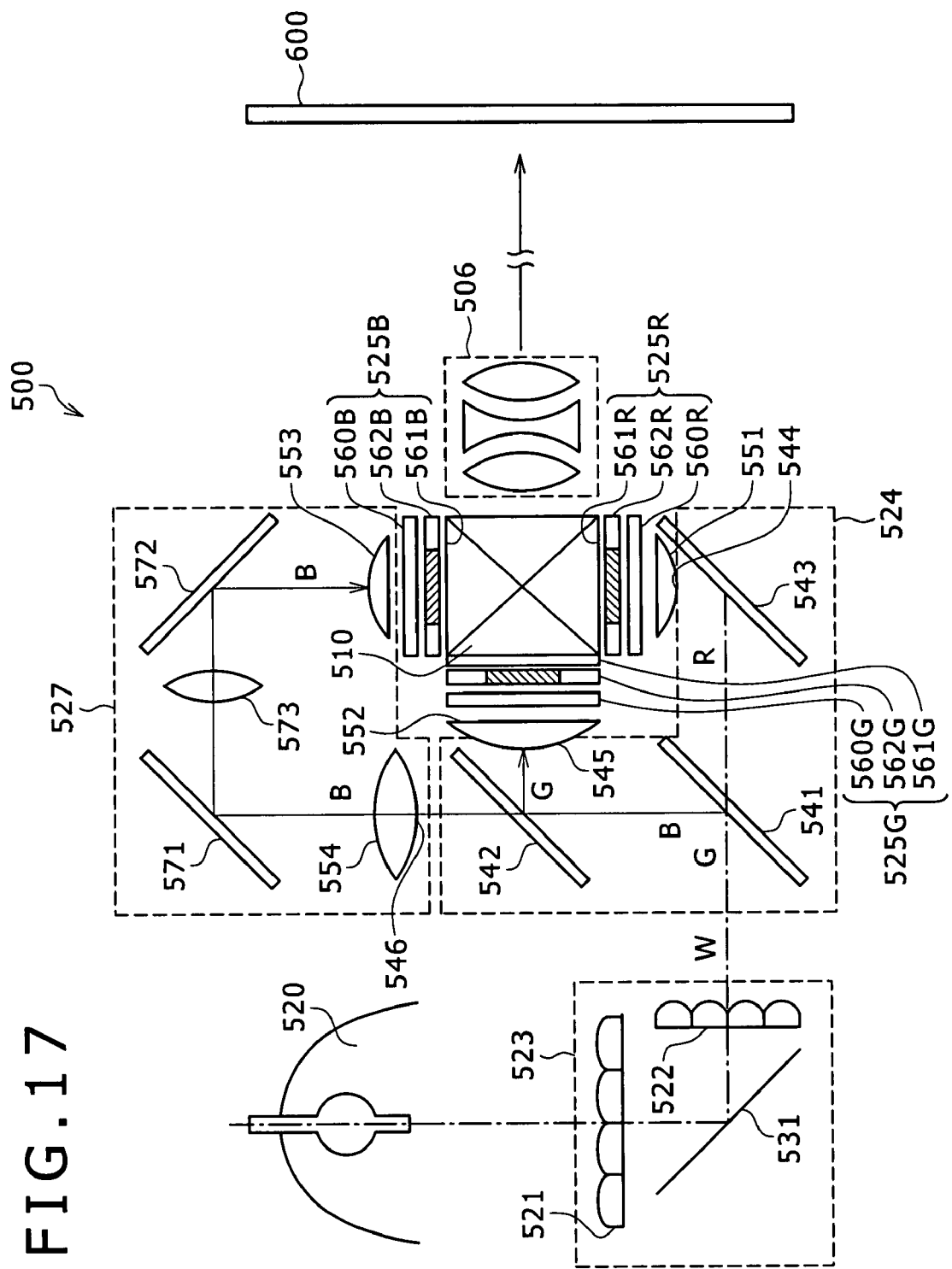
FIG. 17 is a constitution diagram showing a more concrete example of a three-panel type projection type liquid crystal display device according to the present embodiment.

FIG. 17 is a schematic diagram of a constitution of an optical system of a projection type liquid crystal display device 500 provided with three liquid crystal display elements as described above, which are respectively used as liquid crystal display elements 562R, 562G, and 562B for RGB.

The projection type liquid crystal display device 500 uses a light source device 520 and a uniform illumination optical system 523 as an optical system.

The projection type liquid crystal display device 500 includes: a color separating optical system 524 as color separating means for separating a luminous flux W emitted from the uniform illumination optical system 523 into red (R), green (G), and blue (B); three light valves 525R, 525G, and 525B as modulating means for modulating the color luminous fluxes R, G, and B; a color synthesizing prism 510 as color synthesizing means for synthesizing the color luminous fluxes after the modulation; and a projection lens unit 506 as projecting means for enlarging and projecting the synthesized luminous flux onto a surface of a projection plane 600. The projection type liquid crystal display device 500 further includes a light guiding system 527 for guiding the blue luminous flux B to the corresponding light valve 525B.

The uniform illumination optical system 523 includes two lens plates 521 and 522 and a reflecting mirror 531. The two lens plates 521 and 522 are arranged in a state of being orthogonal to each other with the reflecting mirror 531 interposed between the two lens plates 521 and 522. The two lens plates 521 and 522 of the uniform illumination optical system 523 each have a plurality of rectangular lenses arranged in the form of a matrix.

A luminous flux emitted from the light source device 520 is divided into a plurality of partial luminous fluxes by the rectangular lenses of the first lens plate 521. These partial luminous fluxes are made to coincide with each other near the three light valves 525R, 525G, and 525B by the rectangular lenses of the second lens plate 522.

Thus, by using the uniform illumination optical system 523, it is possible to irradiate the three light valves 525R, 525G, and 525B with uniform irradiation light even when the light source device 520 has a nonuniform illumination distribution within a section of the emitted luminous flux.

The color separating optical system 524 includes a blue and green reflecting dichroic mirror 541, a green reflecting dichroic mirror 542, and a reflecting mirror 543.

First, the blue and green reflecting dichroic mirror 541 reflects the blue luminous flux B and the green luminous flux G included in the luminous flux W at a right angle. The blue luminous flux B and the green luminous flux G go to the side of the green reflecting dichroic mirror 542. The red luminous flux R passes through the blue and green reflecting dichroic mirror 541. The reflecting mirror 543 in the rear reflects the red luminous flux R at a right angle. The red luminous flux R is then emitted from an emitting part 544 for the red luminous flux R to the side of the prism unit 510.

Next, of the blue luminous flux B and the green luminous flux G reflected by the blue and green reflecting dichroic mirror 541, only the green luminous flux G is reflected at a right angle by the green reflecting dichroic mirror 542. The green luminous flux G is then emitted from an emitting part 545 for the green luminous flux G to the side of the color synthesizing optical system. The blue luminous flux B, which passes through the green reflecting dichroic mirror 542, is emitted from an emitting part 546 for the blue luminous flux B to the side of the light guiding system 527.

In this case, distances from an emitting part for the luminous flux W of the uniform illumination optical system 523 to the emitting parts 544, 545, and 546 for the respective luminous fluxes in the color separating optical system 524 are set substantially equal to each other. A condensing lens 551 and a condensing lens 552 are respectively arranged on the emitting sides of the emitting part 544 for the red luminous flux R and the emitting part 545 for the green luminous flux G in the color separating optical system 524. Thus, the red luminous flux R and the green luminous flux G emitted from the respective emitting parts enter the condensing lens 551 and the condensing lens 552 and are then collimated.

The red luminous flux R and the green luminous flux G thus collimated respectively enter the light valve 525R and the light valve 525G to be modulated, so that image information corresponding to the respective pieces of color light is added to the red luminous flux R and the green luminous flux G.

That is, driving means not shown in the figure switching-controls these liquid crystal display elements according to image information, and thereby the respective pieces of color light passing through the liquid crystal display elements are modulated. Meanwhile, the blue luminous flux B is guided to the corresponding light valve 525B via the light guiding system 527, and is then similarly modulated in the light valve 525B according to image information.

Incidentally, the light valves 525R, 525G, and 525B in the present example are liquid crystal light valves including incidence side polarizing plates 560R, 560G, and 560B, emission side polarizing plates 561R, 561G, and 561B, and the liquid crystal display elements 562R, 562G, and 562B arranged between the incidence side polarizing plates 560R, 560G, and 560B and the emission side polarizing plates 561R, 561G, and 561B, respectively.

The light guiding system 527 includes: a condensing lens 554 disposed on the emitting side of the emitting part 546 for the blue luminous flux B; an incidence side reflecting mirror 571; an emission side reflecting mirror 572; an intermediate lens 573 disposed between the reflecting mirrors; and a condensing lens 553 disposed on a front side of the light valve 525B.

The blue luminous flux emitted from the condensing lens 546 is guided to the liquid crystal display element 562B via the light guiding system 527, and then modulated. Of the optical path lengths of the respective color luminous fluxes, that is, distances from the emitting part for the luminous flux W to the respective liquid crystal display elements 562R, 562G, and 562B, the optical path length of the blue luminous flux B is the longest. Therefore the blue luminous flux suffers a loss of a largest amount of light.

However, the intervention of the light guiding system 527 can reduce the loss of the amount of light. The color luminous fluxes R, G, and B modulated by passing through the respective light valves 525R, 525G, and 525B enter the color synthesizing prism 510 to be synthesized in the color synthesizing prism 510. Light obtained by synthesizing the color luminous fluxes R, G, and B by the color synthesizing prism 510 is enlarged and projected onto the surface of the projection plane 600 at a predetermined position via the projection lens unit 506.

It is to be noted that the present invention provides the above-described effects when applied not only to a projection type liquid crystal display element but also to any of devices including a reflection type liquid crystal display element, an LCOS device, and an organic EL device.

In addition, the above-described effects can be expected when the present invention is applied to any of liquid crystal display elements including a liquid crystal display element of a built-in drive type, a liquid crystal display element of a type with an external driving circuit, liquid crystal display elements of various sizes ranging from 1 inch to about 15 inches or larger diagonally, and liquid crystal display elements of a simple matrix type, a TFD active matrix type, a passive matrix driving type, an optical rotation mode, a birefringence mode and the like.

As described above, an active matrix type liquid crystal display element according to the present embodiment has electrodes 13 and 14 formed on the opposed surfaces of respective substrates 11 and 12 so as to form pixels in the form of a matrix, and performs frame inversion driving in which a voltage applied to each pixel electrode is of same polarity and inverted in each frame. An alignment film for aligning a liquid crystal in a predetermined direction is formed on the two substrates 11 and 12. The two substrates 11 and 12 are laminated to each other by a sealing material 15 such that the two substrates 11 and 12 are opposed to each other with a predetermined gap between the two substrates 11 and 12. A vertically aligned liquid crystal layer 16 is interposed between the pair of substrates 11 and 12 laminated to each other so as to be opposed to each other. The range of a retardation $\Delta nd$ that can be given as a product of refractive index anisotropy $\Delta n$ and a cell gap d of a liquid crystal material forming a liquid crystal layer 16 is smaller than 0.55 µm, and the range of dielectric anisotropy $\Delta \epsilon$ of the liquid crystal material forming the liquid crystal layer 16 at a measured temperature of 70° C. is −4.5 to less than zero. Thus, the following effects can be obtained.

Reliability is greatly improved, and therefore high image quality can be achieved. It is also possible to prevent an abnormal alignment of a liquid crystal with a high refractive index anisotropy due to a narrow cell gap involved in achieving higher definition, and achieve high contrast and quick response. In addition, in a projection type LCD such as a projector or the like, it is possible to achieve not only longer life but also higher luminance because of a large amount of light applicable by a lamp and a reduction in panel size or a higher aperture ratio as a result of enlarging an effective pixel area.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display element in which a liquid crystal layer is interposed between a pair of substrates laminated to each other by a sealing material such that alignment films are opposed to each other with a predetermined gap between the alignment films,
    wherein a range of dielectric anisotropy $\Delta \epsilon$ of a material for said liquid crystal layer at a measured temperature of 70° C. is −4.5 to −2, wherein a liquid crystal material for said liquid crystal layer is a vertical alignment type liquid crystal and letting $\Delta n$ be reflective index anisotropy and letting d be a cell gap, a range of a retardation $\Delta nd$ is from 0.34 to 0.55 µm and further wherein with respect to 100 parts by weight of a base material for a sealing material, content of a photo-radical polymerization initiator is less than 0.05 weight percent.

2. The liquid crystal display element according to claim 1, wherein said liquid crystal display element is an active matrix type liquid crystal display element that performs frame inversion driving in which a voltage applied to each pixel electrode is of same polarity and inverted in each frame.

3. The liquid crystal display element according to claim 1, wherein a liquid crystal panel having said pixel electrode is a transmissive type liquid crystal panel.

4. The liquid crystal display element according to claim 1, wherein a pixel pitch of said liquid crystal display element is 20 µm or less.

5. The liquid crystal display element according to claim 1, wherein an inorganic alignment film is used as said alignment films.

6. A projection type liquid crystal display device comprising:
    a light source;
    a liquid crystal display element;
    a condensing optical system for guiding light emitted from said light source to said liquid crystal display element; and
    a projection optical system for enlarging and projecting light resulting from light modulation by said liquid crystal display element;
    wherein said liquid crystal display element has a liquid crystal layer interposed between a pair of substrates laminated to each other by a sealing material such that alignment films are opposed to each other with a predetermined gap between the alignment films, and
    wherein a range of dielectric anisotropy $\Delta \epsilon$ of a material for said liquid crystal layer at a measured temperature of 70° C. is −4.5 to −2, wherein a liquid crystal material for said liquid crystal layer is a vertical alignment type liquid crystal and letting $\Delta n$ be reflective index anisotropy and letting d be a cell gap, a range of a retardation Δnd is from 0.34 to 0.55 μm and further wherein with respect to 100 parts by weight of a base material for a sealing material, content of a photo-radical polymerization initiator is less than 0.05 weight percent.

7. The projection type liquid crystal display device according to claim 6, wherein said liquid crystal display element is an active matrix type liquid crystal display element that performs frame inversion driving in which a voltage applied to each pixel electrode is of same polarity and inverted in each frame.

\* \* \* \* \*